US009754164B2

(12) United States Patent
Macciola et al.

(10) Patent No.: US 9,754,164 B2
(45) Date of Patent: Sep. 5, 2017

(54) SYSTEMS AND METHODS FOR CLASSIFYING OBJECTS IN DIGITAL IMAGES CAPTURED USING MOBILE DEVICES

(71) Applicant: Kofax, Inc., Irvine, CA (US)

(72) Inventors: Anthony Macciola, Irvine, CA (US); Jan W. Amtrup, Silver Spring, MD (US); Jiyong Ma, San Diego, CA (US); Alexander Shustorovich, Pittsford, NY (US); Christopher W. Thrasher, Rochester, NY (US); Stephen Michael Thompson, Oceanside, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/818,196

(22) Filed: Aug. 4, 2015

(65) Prior Publication Data

US 2015/0339526 A1    Nov. 26, 2015

Related U.S. Application Data

(63) Continuation of application No. 14/209,825, filed on Mar. 13, 2014, now Pat. No. 9,311,531.
(Continued)

(51) Int. Cl.
| | |
|---|---|
| *G06K 9/00* | (2006.01) |
| *G06T 7/00* | (2017.01) |
| *G06T 7/11* | (2017.01) |

(52) U.S. Cl.
CPC ..... *G06K 9/00483* (2013.01); *G06K 9/00442* (2013.01); *G06K 9/00523* (2013.01);
(Continued)

(58) Field of Classification Search
CPC .................................................. G06K 9/00483
See application file for complete search history.

(56) References Cited

U.S. PATENT DOCUMENTS

| 1,660,102 A | 2/1928 | Appelt et al. |
| 3,069,654 A | 12/1962 | Hough |

(Continued)

FOREIGN PATENT DOCUMENTS

| CN | 101052991 A | 10/2007 |
| EP | 0549329 A2 | 6/1993 |

(Continued)

OTHER PUBLICATIONS

Non-Final Office Action from U.S Appl. No. 14/927,359, dated Nov. 21, 2016.
(Continued)

*Primary Examiner* — David F Dunphy
(74) *Attorney, Agent, or Firm* — Zilka-Kotab, PC

(57) ABSTRACT

Systems and methods for mobile image data capture and processing are disclosed. The techniques encompass receipt or capture of digital image data, detecting an object such as a document depicted in a digital image corresponding to the digital image data, processing the digital image to improve image quality, classifying the object from the processed image data, and extracting useful information from the object. Processing may improve image quality by correcting artifacts such as distortion, skew, blur, shadows, etc. common to digital images captured using mobile devices. Classification is based on identifying unique features (and/or combinations thereof) within the image data and determining whether the identified features indicate the object belongs to a class of known objects having similar characteristics, or is unique to all known classes. Extraction is based in whole or in part on object classification. All
(Continued)

operations may be performed using mobile technology exclusively.

19 Claims, 8 Drawing Sheets

Related U.S. Application Data

(60) Provisional application No. 61/780,747, filed on Mar. 13, 2013.

(52) U.S. Cl.
CPC ............ *G06K 9/00536* (2013.01); *G06T 7/11* (2017.01); *G06T 2207/20104* (2013.01)

(56) References Cited

U.S. PATENT DOCUMENTS

| | | | |
|---|---|---|---|
| 3,696,599 A | 10/1972 | Palmer et al. | |
| 4,558,461 A * | 12/1985 | Schlang | G06K 9/3283 382/290 |
| 4,656,665 A | 4/1987 | Pennebaker | |
| 4,836,026 A | 6/1989 | P'an et al. | |
| 4,903,312 A | 2/1990 | Sato | |
| 4,992,863 A | 2/1991 | Moriya | |
| 5,020,112 A | 5/1991 | Chou | |
| 5,063,604 A | 11/1991 | Weiman | |
| 5,101,448 A | 3/1992 | Kawachiya et al. | |
| 5,124,810 A | 6/1992 | Seto | |
| 5,151,260 A | 9/1992 | Contursi et al. | |
| 5,159,667 A | 10/1992 | Borrey et al. | |
| 5,181,260 A | 1/1993 | Kurosu et al. | |
| 5,202,934 A | 4/1993 | Miyakawa et al. | |
| 5,220,621 A | 6/1993 | Saitoh | |
| 5,268,967 A | 12/1993 | Jang et al. | |
| 5,282,055 A | 1/1994 | Suzuki | |
| 5,293,429 A | 3/1994 | Pizano et al. | |
| 5,313,527 A | 5/1994 | Guberman et al. | |
| 5,317,646 A | 5/1994 | Sang, Jr. et al. | |
| 5,344,132 A | 9/1994 | LeBrun et al. | |
| 5,353,673 A | 10/1994 | Lynch | |
| 5,355,547 A | 10/1994 | Fitjer | |
| 5,375,197 A | 12/1994 | Kang | |
| 5,430,810 A | 7/1995 | Saeki | |
| 5,467,407 A | 11/1995 | Guberman et al. | |
| 5,473,742 A | 12/1995 | Polyakov et al. | |
| 5,546,474 A | 8/1996 | Zuniga | |
| 5,563,723 A | 10/1996 | Beaulieu et al. | |
| 5,563,966 A | 10/1996 | Ise et al. | |
| 5,586,199 A | 12/1996 | Kanda et al. | |
| 5,594,815 A | 1/1997 | Fast et al. | |
| 5,596,655 A | 1/1997 | Lopez | |
| 5,602,964 A | 2/1997 | Barrett | |
| 5,629,989 A | 5/1997 | Osada | |
| 5,652,663 A | 7/1997 | Zelten | |
| 5,668,890 A | 9/1997 | Winkelman | |
| 5,680,525 A | 10/1997 | Sakai et al. | |
| 5,696,611 A | 12/1997 | Nishimura et al. | |
| 5,696,805 A | 12/1997 | Gaborski et al. | |
| 5,699,244 A | 12/1997 | Clark, Jr. et al. | |
| 5,717,794 A | 2/1998 | Koga et al. | |
| 5,721,940 A | 2/1998 | Luther et al. | |
| 5,757,963 A | 5/1998 | Ozaki et al. | |
| 5,760,912 A | 6/1998 | Itoh | |
| 5,781,665 A | 7/1998 | Cullen et al. | |
| 5,818,978 A | 10/1998 | Al-Hussein | |
| 5,822,454 A | 10/1998 | Rangarajan | |
| 5,825,915 A | 10/1998 | Michimoto et al. | |
| 5,832,138 A | 11/1998 | Nakanishi et al. | |
| 5,839,019 A | 11/1998 | Ito | |
| 5,848,184 A | 12/1998 | Taylor et al. | |
| 5,857,029 A | 1/1999 | Patel | |
| 5,867,264 A | 2/1999 | Hinnrichs | |
| 5,899,978 A | 5/1999 | Irwin | |
| 5,937,084 A | 8/1999 | Crabtree et al. | |
| 5,953,388 A | 9/1999 | Walnut et al. | |
| 5,987,172 A | 11/1999 | Michael | |
| 6,002,489 A | 12/1999 | Murai et al. | |
| 6,005,958 A | 12/1999 | Farmer et al. | |
| 6,005,968 A | 12/1999 | Granger | |
| 6,009,191 A | 12/1999 | Julier | |
| 6,009,196 A | 12/1999 | Mahoney | |
| 6,011,595 A | 1/2000 | Henderson et al. | |
| 6,016,361 A | 1/2000 | Hongu et al. | |
| 6,038,348 A | 3/2000 | Carley | |
| 6,055,968 A | 5/2000 | Sasaki et al. | |
| 6,067,385 A | 5/2000 | Cullen et al. | |
| 6,072,916 A | 6/2000 | Suzuki | |
| 6,073,148 A | 6/2000 | Rowe et al. | |
| 6,098,065 A | 8/2000 | Skillen et al. | |
| 6,104,830 A | 8/2000 | Schistad | |
| 6,104,840 A | 8/2000 | Ejiri et al. | |
| 6,118,544 A | 9/2000 | Rao | |
| 6,118,552 A | 9/2000 | Suzuki et al. | |
| 6,154,217 A | 11/2000 | Aldrich | |
| 6,192,360 B1 | 2/2001 | Dumais et al. | |
| 6,215,469 B1 | 4/2001 | Mori et al. | |
| 6,219,158 B1 | 4/2001 | Dawe | |
| 6,219,773 B1 | 4/2001 | Garibay, Jr. et al. | |
| 6,223,223 B1 | 4/2001 | Kumpf et al. | |
| 6,229,625 B1 | 5/2001 | Nakatsuka | |
| 6,233,059 B1 | 5/2001 | Kodaira et al. | |
| 6,263,122 B1 | 7/2001 | Simske et al. | |
| 6,292,168 B1 | 9/2001 | Venable et al. | |
| 6,327,581 B1 | 12/2001 | Platt | |
| 6,337,925 B1 | 1/2002 | Cohen et al. | |
| 6,347,152 B1 | 2/2002 | Shinagawa et al. | |
| 6,347,162 B1 | 2/2002 | Suzuki | |
| 6,356,647 B1 | 3/2002 | Bober et al. | |
| 6,370,277 B1 | 4/2002 | Borrey et al. | |
| 6,385,346 B1 | 5/2002 | Gillihan et al. | |
| 6,393,147 B2 | 5/2002 | Danneels et al. | |
| 6,396,599 B1 | 5/2002 | Patton et al. | |
| 6,408,094 B1 | 6/2002 | Mirzaoff et al. | |
| 6,408,105 B1 | 6/2002 | Maruo | |
| 6,424,742 B2 | 7/2002 | Yamamoto et al. | |
| 6,433,896 B1 | 8/2002 | Ueda et al. | |
| 6,456,738 B1 | 9/2002 | Tsukasa | |
| 6,463,430 B1 | 10/2002 | Brady et al. | |
| 6,469,801 B1 | 10/2002 | Telle | |
| 6,473,198 B1 | 10/2002 | Matama | |
| 6,473,535 B1 | 10/2002 | Takaoka | |
| 6,480,304 B1 | 11/2002 | Os et al. | |
| 6,480,624 B1 | 11/2002 | Horie et al. | |
| 6,501,855 B1 | 12/2002 | Zelinski | |
| 6,512,848 B2 | 1/2003 | Wang et al. | |
| 6,522,791 B2 | 2/2003 | Nagarajan | |
| 6,525,840 B1 | 2/2003 | Haraguchi et al. | |
| 6,563,531 B1 | 5/2003 | Matama | |
| 6,601,026 B2 | 7/2003 | Appelt et al. | |
| 6,614,930 B1 | 9/2003 | Agnihotri et al. | |
| 6,621,595 B1 | 9/2003 | Fan et al. | |
| 6,628,416 B1 | 9/2003 | Hsu et al. | |
| 6,628,808 B1 | 9/2003 | Bach et al. | |
| 6,633,857 B1 | 10/2003 | Tipping | |
| 6,643,413 B1 | 11/2003 | Shum et al. | |
| 6,646,765 B1 | 11/2003 | Barker et al. | |
| 6,658,147 B2 | 12/2003 | Gorbatov et al. | |
| 6,665,425 B1 | 12/2003 | Sampath et al. | |
| 6,667,774 B2 | 12/2003 | Berman et al. | |
| 6,675,159 B1 | 1/2004 | Lin et al. | |
| 6,701,009 B1 | 3/2004 | Makoto et al. | |
| 6,704,441 B1 | 3/2004 | Inagaki et al. | |
| 6,724,916 B1 | 4/2004 | Shyu | |
| 6,732,046 B1 | 5/2004 | Joshi | |
| 6,748,109 B1 | 6/2004 | Yamaguchi | |
| 6,751,349 B2 | 6/2004 | Matama | |
| 6,757,081 B1 | 6/2004 | Fan et al. | |
| 6,757,427 B1 | 6/2004 | Hongu | |
| 6,763,515 B1 | 7/2004 | Vazquez et al. | |
| 6,765,685 B1 | 7/2004 | Yu | |
| 6,778,684 B1 | 8/2004 | Bollman | |
| 6,781,375 B2 | 8/2004 | Miyazaki et al. | |

(56) References Cited

U.S. PATENT DOCUMENTS

| | | |
|---|---|---|
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,831,755 B1 | 12/2004 | Narushima et al. |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 7,006,707 B2 | 2/2006 | Peterson |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,149,347 B1 | 12/2006 | Wnek |
| 7,167,281 B1 | 1/2007 | Fujimoto et al. |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,286,177 B2 | 10/2007 | Cooper |
| 7,298,897 B1 | 11/2007 | Dominguez et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,702,162 B2 | 4/2010 | Cheong et al. |
| 7,735,721 B1 | 6/2010 | Ma et al. |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,782,384 B2 | 8/2010 | Kelly |
| 7,787,695 B2 | 8/2010 | Nepomniachtchi et al. |
| 7,937,345 B2 | 5/2011 | Schmidtler et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,081,227 B1 | 12/2011 | Kim et al. |
| 8,094,976 B2 | 1/2012 | Berard et al. |
| 8,135,656 B2 | 3/2012 | Evanitsky |
| 8,184,156 B2 | 5/2012 | Mino et al. |
| 8,194,965 B2 | 6/2012 | Lossev et al. |
| 8,213,687 B2 | 7/2012 | Fan |
| 8,239,335 B2 | 8/2012 | Schmidtler et al. |
| 8,244,031 B2 | 8/2012 | Cho et al. |
| 8,279,465 B2 | 10/2012 | Couchman |
| 8,295,599 B2 | 10/2012 | Katougi et al. |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,441,548 B1 | 5/2013 | Nechyba et al. |
| 8,452,098 B2 | 5/2013 | Nepomniachtchi et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,587,818 B2 | 11/2013 | Imaizumi et al. |
| 8,620,058 B2 | 12/2013 | Nepomniachtchi et al. |
| 8,639,621 B1 | 1/2014 | Ellis et al. |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,749,839 B2 | 6/2014 | Borrey et al. |
| 8,774,516 B2 | 7/2014 | Amtrup et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 8,879,120 B2 | 11/2014 | Thrasher et al. |

(56) References Cited

U.S. PATENT DOCUMENTS

| | | | |
|---|---|---|---|
| 8,885,229 B1 | 11/2014 | Amtrup et al. |
| 8,955,743 B1 | 2/2015 | Block et al. |
| 8,971,587 B2 | 3/2015 | Macciola et al. |
| 8,989,515 B2 | 3/2015 | Shustorovich et al. |
| 9,058,515 B1 | 6/2015 | Amtrup et al. |
| 9,117,117 B2 | 8/2015 | Macciola et al. |
| 9,129,210 B2 | 9/2015 | Borrey et al. |
| 9,137,417 B2 | 9/2015 | Macciola et al. |
| 9,158,967 B2 | 10/2015 | Shustorovich et al. |
| 9,165,187 B2 | 10/2015 | Macciola et al. |
| 9,165,188 B2 | 10/2015 | Thrasher et al. |
| 9,275,281 B2 | 3/2016 | Macciola |
| 9,311,531 B2 | 4/2016 | Amtrup et al. |
| 9,342,742 B2 | 5/2016 | Amtrup et al. |
| 9,355,312 B2 | 5/2016 | Amtrup et al. |
| 9,514,357 B2 | 12/2016 | Macciola et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0113801 A1 | 8/2002 | Reavy et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0026479 A1 | 2/2003 | Thomas et al. |
| 2003/0030638 A1 | 2/2003 | Astrom et al. |
| 2003/0044012 A1 | 3/2003 | Eden |
| 2003/0046445 A1 | 3/2003 | Witt et al. |
| 2003/0053696 A1 | 3/2003 | Schmidt et al. |
| 2003/0063213 A1 | 4/2003 | Poplin |
| 2003/0086615 A1* | 5/2003 | Dance .............. G06K 9/00456 382/200 |
| 2003/0095709 A1 | 5/2003 | Zhou |
| 2003/0101161 A1 | 5/2003 | Ferguson et al. |
| 2003/0117511 A1 | 6/2003 | Belz et al. |
| 2003/0120653 A1 | 6/2003 | Brady et al. |
| 2003/0142328 A1 | 7/2003 | McDaniel et al. |
| 2003/0151674 A1 | 8/2003 | Lin |
| 2003/0156201 A1 | 8/2003 | Zhang |
| 2003/0197063 A1 | 10/2003 | Longacre |
| 2003/0210428 A1 | 11/2003 | Bevlin et al. |
| 2003/0223615 A1 | 12/2003 | Keaton et al. |
| 2004/0021909 A1 | 2/2004 | Kikuoka |
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143547 A1 | 7/2004 | Mersky |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0180632 A1 | 8/2005 | Aradhye et al. |
| 2005/0193325 A1 | 9/2005 | Epstein |
| 2005/0204058 A1 | 9/2005 | Philbrick et al. |
| 2005/0206753 A1 | 9/2005 | Sakurai et al. |
| 2005/0212925 A1 | 9/2005 | Lefebure et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2006/0013463 A1 | 1/2006 | Ramsay et al. |
| 2006/0023271 A1 | 2/2006 | Boay et al. |
| 2006/0031344 A1 | 2/2006 | Mishima et al. |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0147113 A1 | 7/2006 | Han |
| 2006/0159364 A1 | 7/2006 | Poon et al. |
| 2006/0161646 A1 | 7/2006 | Chene et al. |
| 2006/0195491 A1 | 8/2006 | Nieland et al. |
| 2006/0203107 A1 | 9/2006 | Steinberg et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256371 A1 | 11/2006 | King et al. |
| 2006/0256392 A1 | 11/2006 | Van Hoof et al. |
| 2006/0262962 A1 | 11/2006 | Hull et al. |
| 2006/0263134 A1 | 11/2006 | Beppu |
| 2006/0265640 A1 | 11/2006 | Albornoz et al. |
| 2006/0268352 A1 | 11/2006 | Tanigawa et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2006/0294154 A1 | 12/2006 | Shimizu |
| 2007/0002348 A1 | 1/2007 | Hagiwara |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0177818 A1 | 8/2007 | Teshima et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0097936 A1 | 4/2008 | Schmidtler et al. |

(56) References Cited

U.S. PATENT DOCUMENTS

| | | |
|---|---|---|
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0147790 A1 | 6/2008 | Malaney et al. |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0199081 A1 | 8/2008 | Kimura et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0089078 A1 | 4/2009 | Bursey |
| 2009/0103808 A1 | 4/2009 | Dey et al. |
| 2009/0141985 A1 | 6/2009 | Sheinin et al. |
| 2009/0175537 A1 | 7/2009 | Tribelhorn et al. |
| 2009/0185241 A1 | 7/2009 | Nepomniachtchi |
| 2009/0214112 A1 | 8/2009 | Borrey et al. |
| 2009/0228499 A1 | 9/2009 | Schmidtler et al. |
| 2009/0327250 A1 | 12/2009 | Green et al. |
| 2010/0060910 A1 | 3/2010 | Fechter |
| 2010/0060915 A1 | 3/2010 | Suzuki et al. |
| 2010/0166318 A1 | 7/2010 | Ben-Horesh et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0209006 A1 | 8/2010 | Grigsby et al. |
| 2010/0232706 A1 | 9/2010 | Forutanpour |
| 2010/0280859 A1 | 11/2010 | Frederick, II |
| 2010/0331043 A1 | 12/2010 | Chapman et al. |
| 2011/0013039 A1 | 1/2011 | Aisaka et al. |
| 2011/0025860 A1 | 2/2011 | Katougi et al. |
| 2011/0032570 A1 | 2/2011 | Imaizumi et al. |
| 2011/0035284 A1 | 2/2011 | Moshfeghi |
| 2011/0091092 A1 | 4/2011 | Nepomniachtchi et al. |
| 2011/0116716 A1 | 5/2011 | Kwon et al. |
| 2011/0145178 A1 | 6/2011 | Schmidtler et al. |
| 2011/0182500 A1 | 7/2011 | Esposito et al. |
| 2011/0194127 A1 | 8/2011 | Nagakoshi et al. |
| 2011/0196870 A1 | 8/2011 | Schmidtler et al. |
| 2011/0246076 A1 | 10/2011 | Su et al. |
| 2011/0249905 A1 | 10/2011 | Singh et al. |
| 2011/0280450 A1 | 11/2011 | Nepomniachtchi et al. |
| 2011/0285873 A1 | 11/2011 | Showering |
| 2011/0285874 A1 | 11/2011 | Showering et al. |
| 2012/0038549 A1 | 2/2012 | Mandella et al. |
| 2012/0057756 A1 | 3/2012 | Yoon et al. |
| 2012/0075442 A1 | 3/2012 | Vujic |
| 2012/0113489 A1 | 5/2012 | Heit et al. |
| 2012/0114249 A1 | 5/2012 | Conwell |
| 2012/0116957 A1 | 5/2012 | Zanzot et al. |
| 2012/0162527 A1 | 6/2012 | Baker |
| 2012/0194692 A1 | 8/2012 | Mers et al. |
| 2012/0230577 A1 | 9/2012 | Calman et al. |
| 2012/0272192 A1 | 10/2012 | Grossman et al. |
| 2012/0284122 A1 | 11/2012 | Brandis |
| 2013/0004076 A1* | 1/2013 | Koo .................. G06K 9/228 382/176 |
| 2013/0022231 A1 | 1/2013 | Nepomniachtchi et al. |
| 2013/0027757 A1 | 1/2013 | Lee et al. |
| 2013/0060596 A1 | 3/2013 | Gu et al. |
| 2013/0073459 A1 | 3/2013 | Zacarias et al. |
| 2013/0080347 A1 | 3/2013 | Paul et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0152176 A1 | 6/2013 | Courtney et al. |
| 2013/0182002 A1 | 7/2013 | Macciola et al. |
| 2013/0182105 A1* | 7/2013 | Fahn .................... G06K 9/6269 348/143 |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0188865 A1 | 7/2013 | Saha et al. |
| 2013/0223762 A1 | 8/2013 | Nagamasa |
| 2013/0230246 A1 | 9/2013 | Nuggehalli |
| 2013/0251280 A1 | 9/2013 | Borrey et al. |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0290036 A1 | 10/2013 | Strange |
| 2013/0297353 A1 | 11/2013 | Strange et al. |
| 2013/0308832 A1 | 11/2013 | Schmidtler et al. |
| 2014/0003721 A1* | 1/2014 | Saund .................. G06K 9/00449 382/182 |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0172687 A1 | 6/2014 | Chirehdast |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270439 A1 | 9/2014 | Chen |
| 2014/0270536 A1 | 9/2014 | Amtrup et al. |
| 2014/0328520 A1 | 11/2014 | Macciola et al. |
| 2014/0376060 A1 | 12/2014 | Bocharov et al. |
| 2015/0120564 A1 | 4/2015 | Smith et al. |
| 2015/0161765 A1 | 6/2015 | Kota et al. |
| 2016/0028921 A1 | 1/2016 | Thrasher et al. |
| 2016/0125613 A1 | 5/2016 | Shustorovich et al. |
| 2016/0217319 A1 | 7/2016 | Bhanu et al. |
| 2017/0046788 A1 | 2/2017 | Macciola et al. |
| 2017/0147572 A1 | 5/2017 | Kilby et al. |

FOREIGN PATENT DOCUMENTS

| | | |
|---|---|---|
| EP | 0767578 A2 | 4/1997 |
| EP | 0936804 A2 | 8/1999 |
| EP | 1054331 A2 | 11/2000 |
| EP | 1128659 A1 | 8/2001 |
| EP | 1317133 A1 | 6/2003 |
| EP | 1319133 A1 | 6/2003 |
| EP | 1422920 A2 | 5/2004 |
| EP | 1956518 A1 | 8/2008 |
| EP | 1959363 A2 | 8/2008 |
| EP | 1976259 A1 | 10/2008 |
| EP | 2107480 A1 | 10/2009 |
| JP | H07260701 A | 10/1995 |
| JP | H0962826 A | 3/1997 |
| JP | H09116720 A | 5/1997 |
| JP | H11118444 A | 4/1999 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005085173 A | 3/2005 |
| JP | 2005173730 A | 6/2005 |

(56) References Cited

FOREIGN PATENT DOCUMENTS

| | | |
|---|---|---|
| JP | 2006031379 A | 2/2006 |
| JP | 2006209588 A | 8/2006 |
| JP | 2006330863 A | 12/2006 |
| JP | 2008134683 A | 6/2008 |
| JP | 2011034387 A | 2/2011 |
| JP | 2011055467 A | 3/2011 |
| JP | 2012009033 A | 1/2012 |
| JP | 2012517637 A | 8/2012 |
| JP | 2013196357 A | 9/2013 |
| JP | 5462286 B2 | 4/2014 |
| TW | 401553 B | 8/2000 |
| WO | 9604749 A1 | 2/1996 |
| WO | 9847098 A1 | 10/1998 |
| WO | 9967731 A1 | 12/1999 |
| WO | 0263812 A2 | 8/2002 |
| WO | 02063812 A1 | 8/2002 |
| WO | 2004053630 A2 | 6/2004 |
| WO | 2004056360 A1 | 7/2004 |
| WO | 2006104627 A1 | 10/2006 |
| WO | 2008008142 A2 | 1/2008 |
| WO | 2010030056 A1 | 3/2010 |
| WO | 2010096192 A1 | 8/2010 |

OTHER PUBLICATIONS

Final Office Action from U.S Appl. No. 14/814,455, dated Dec. 16, 2016.
International Search Report and Written Opinion from International Application No. PCT/US14/26569, dated Aug. 12, 2014.
Gllavata et al., "Finding Text in Images Via Local Thresholding," International Symposium on Signal Processing and Information Technology, Dec. 2003, pp. 539-542.
Zunino et al., "Vector Quantization for License-Plate Location and Image Coding," IEEE Transactions on Industrial Electronics, vol. 47, Issue 1, Feb. 2000, pp. 159-167.
Extended European Search Report from European Application No. 14775259.6, dated Jun. 1, 2016.
Non-Final Office Action from U.S. Appl. No. 13/898,407, dated Aug. 1, 2013.
Final Office Action from U.S. Appl. No. 13/898,407, dated Jan. 13, 2014.
Notice of Allowance from U.S. Appl. No. 13/898,407, dated Apr. 23, 2014.
Non-Final Office Action from U.S. Appl. No. 14/340,460, dated Jan. 16, 2015.
Notice of Allowance from U.S. Appl. No. 14/340,460, dated Apr. 28, 2015.
Office Action from Japanese Patent Application No. 2014-552356, dated Jun. 2, 2015.
Office Action from Taiwan Application No. 102101177, dated Dec. 17, 2014.
Notice of Allowance from U.S. Appl. No. 14/220,023, dated Jan. 30, 2015.
Notice of Allowance from U.S. Appl. No. 14/220,029, dated Feb. 11, 2015.
International Search Report and Written Opinion from International Application No. PCT/US2013/021336, dated May 23, 2013.
Non-Final Office Action from U.S. Appl. No. 13/740,127, dated Oct. 27, 2014.
Notice of Allowance from U.S. Appl. No. 13/740,131, dated Oct. 27, 2014.
Final Office Action from U.S. Appl. No. 13/740,134, dated Mar. 3, 2015.
Non-Final Office Action from U.S. Appl. No. 13/740,134, dated Oct. 10, 2014.
Non-Final Office Action from U.S. Appl. No. 13/740,138, dated Dec. 1, 2014.
Notice of Allowance from U.S. Appl. No. 13/740,139, dated Aug. 29, 2014.
Notice of Allowance from U.S. Appl. No. 13/740,145, dated Mar. 30, 2015.
Non-Final Office Action from U.S. Appl. No. 13/740,145, dated Sep. 29, 2014.
Notice of Allowance from Taiwan Patent Application No. 102101177, dated Apr. 24, 2015.
Notice of Allowance from U.S. Appl. No. 13/740,138, dated Jun. 5, 2015.
Notice of Allowance from U.S. Appl. No. 13/740,127, dated Jun. 8, 2015.
Notice of Allowance from U.S. Appl. No. 14/569,375, dated Apr. 15, 2015.
Notice of Allowance from U.S. Appl. No. 13/740,134, dated May 29, 2015.
Notice of Allowability from U.S. Appl. No. 13/740,145, dated May 26, 2015.
Corrected Notice of Allowability from U.S. Appl. No. 13/740,138, dated Jul. 8, 2018.
Non-Final Office Action from U.S. Appl. No. 13/740,127, dated Feb. 23, 2015.
Final Office Action from U.S. Appl. No. 13/740,134, dated Mar. 3, 3015.
Notice of Allowance from U.S. Appl. No. 14/804,276, dated Oct. 21, 2015.
Extended Eurpopean Search Report from European Application No. 13738301.4, dated Nov. 17, 2015.
Notice of Allowance from U.S. Appl. No. 13/740,145, dated Jan. 15, 2016.
Office Action from Taiwan Patent Application No. 102101177, dated Dec. 17, 2014.
Non-Final Office Action from U.S. Appl. No. 13/740,141, dated Oct. 16, 2015.
Notice of Allowance from U.S. Appl. No. 13/740,145, dated Sep. 8, 2015.
Notice of Allowance from U.S. Appl. No. 14/334,558, dated Sep. 10, 2014.
Notice of Allowance from U.S. Appl. No. 13/740,123, dated Jul. 10, 2014.
Intsig Information Co., Ltd., "CamScanner," www.intsig.com/en/camscanner.html, retrieved Oct. 25, 2012.
Intsig Information Co., Ltd., "Product Descriptions," www.intsig.com/en/product.html, retrieved Oct. 25, 2012.
Non-Final Office Action from U.S. Appl. No. 14/814,455, dated Jun. 17, 2016.
Final Office Action from U.S. Appl. No. 13/740,141, dated May 5, 2016.
Thrasher, C. W. et al., U.S. Appl. No. 15/214,351, filed Jul. 19, 2016.
Notice of Allowance from U.S. Appl. No. 13/740,141, dated Jul. 29, 2016.
International Search Report and Written Opinion from International Application No. PCT/US2016/043207, dated Oct. 21, 2016.
Office Action from Chinese Patent Application No. 201380004057.2, dated Feb. 27, 2017.
Notice of Allowance from U.S. Appl. No. 14/814,455, dated Mar. 30, 2017.
Non-Final Office Action from U.S. Appl. No. 14/932,902, dated Apr. 11, 2017.
Non-Final Office Action from U.S. Appl. No. 15/390,321, dated Mar. 17, 2017.
Notice of Allowance from U.S. Appl. No. 15/146,848, dated Apr. 13, 2017.
Notice of Allowance from U.S. Appl. No. 15/191,442, dated Apr. 24, 2017.
Final Office Action from U.S. Appl. No. 14/927,359, dated Apr. 28, 2017.
Notice of Allowance from U.S. Appl. No. 15/234,969, dated May 8, 2017.
Notice of Allowance from U.S. Appl. No. 14/814,455, dated May 26, 2017.

(56) References Cited

OTHER PUBLICATIONS

Corrected Notice of Allowance from U.S. Appl. No. 15/191,442, dated May 26, 2017.
Extended European Search Report from European Application No. 14881675.4, dated Jun. 7, 2017.

* cited by examiner

SYSTEMS AND METHODS FOR CLASSIFYING OBJECTS IN DIGITAL IMAGES CAPTURED USING MOBILE DEVICES

RELATED APPLICATIONS

This application is a continuation of U.S. patent application Ser. No. 14/209,825, filed Mar. 13, 2014, which claims priority to U.S. Provisional Patent Application No. 61/780,747, filed Mar. 13, 2013, which are herein incorporated by reference.

This application is related to U.S. Pat. No. 8,855,375, which is herein incorporated by reference in its entirety.

FIELD OF INVENTION

The present invention relates to mobile image capture and image processing, and more particularly to capturing and processing digital images using a mobile device, and classifying objects detected in such digital images.

BACKGROUND OF THE INVENTION

Digital images having depicted therein an object inclusive of documents such as a letter, a check, a bill, an invoice, etc. have conventionally been captured and processed using a scanner or multifunction peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

Traditionally, digital images have been a valuable resource of data for a nearly infinite variety of applications. In a business context, digital images have been extensively utilized for communicating and processing information, typically represented in documents and/or associated image data (such as a digital image of a vehicle associated with a digital image of an insurance claim, vehicle registration, bill of sale, etc.). Increasingly powerful mobile devices offer opportunities to expand digital image processing into the mobile arena and provide improved capability to capture and process digital image data in real-time using mobile technology.

Conventional data extraction methods for use in existing mobile and non-mobile devices rely on object templates, typically generated and/or curated by expert users, to provide information to an extraction engine instructing the engine where to locate information for extraction. In the particular case of documents, the conventional extraction technology is provided the location of one or more (typically rectangular) regions of a document, instructed to perform optical character recognition (OCR) on the region(s), and then output the determined characters to another process or file.

While the conventional extraction engines and methods are capable of reliably extracting information from objects for which a template has been previously defined, it is not possible to dynamically extract information from objects about which no template exists. This is an undesirable limitation that restricts users from using powerful extraction technology on an increasingly diverse array of documents encountered in the modern world.

Furthermore, conventional extraction engines require extensive input from expert curators to define templates and maintain template definitions as object classes evolve. The performance of template-based extraction is thus a direct function of the curators' ability to properly define templates and the curators' determination of which information is "worth" extracting. Therefore, expert curators serve as an undesirable bottleneck on the robustness of data extraction in terms of extraction accuracy and precision, as well as the scope of objects from which data may be extracted.

Further still, conventional extraction methods rely primarily or exclusively on OCR techniques to extract text characters from image data. The OCR engine is forced to make estimates regarding the identity of text characters, which inevitably leads to erroneous reporting of characters when image quality is poor, when characters do not match a predefined set of "known" characters, when an apparent character appears ambiguous such that the OCR engine cannot reliably distinguish between multiple candidate characters (e.g. a period "."versus a comma"." or a letter "l" versus a numeral "1"). Expert curators can mitigate these problems by urging the OCR engine toward the correct decision when certain known patterns of characters are expected, but even this mitigation is limited in scope and errors ultimately require undesirable end-user interaction.

Therefore, it would be highly beneficial to provide new method, system and/or computer program product technology for extracting information from digital image data using mobile devices. It would be further beneficial to enable extraction of information without relying on templates, thus circumventing the need for expert curators and enabling users to dynamically generate and modify extraction models to extract data from diverse and mutable classes of objects. It would be still further beneficial to provide methods for extracting data without relying on OCR techniques to overcome the limitations of predefined character classes, poor image quality, and reduce or remove the need for user correction of OCR mistakes.

SUMMARY OF THE INVENTION

In one embodiment, a method includes: receiving or capturing digital image data; detecting an object depicted in a digital image represented by the digital image data; processing the digital image to improve an image quality of at least the object; determining an object classification based on the processed digital image; building or determining an extraction model based at least in part on the object classification; and extracting, using the extraction model, information from one or more regions of interest within the digital image.

In another embodiment, a mobile device is configured to execute logic. The mobile device includes logic specifically configured to cause the mobile device, upon execution of the logic, to: receive or capture digital image data; detect an object depicted in a digital image represented by the digital image data; process the digital image to improve an image quality of at least the object; determine an object classification based on the processed digital image; build or determine an extraction model based at least in part on the object classification; and extract, using the extraction model, information from one or more regions of interest within the object.

In yet another embodiment, a computer program product includes a computer readable storage medium having embodied thereon executable instructions configured to cause a mobile device, upon execution of the instructions, to: receive or capture digital image data; detect an object depicted in a digital image represented by the digital image data; process the digital image to improve an image quality of at least the object; determine an object classification based on the processed digital image; build or determine an extraction model based at least in part on the object classification; and extract, using the extraction model, information from one or more regions of interest within the object.

Other aspects and features of the presently disclosed inventive concepts will become apparent from the following detailed descriptions, which should be understood to be illustrative in nature and not limiting on the instant disclosure.

DETAILED DESCRIPTION

Figure 1:
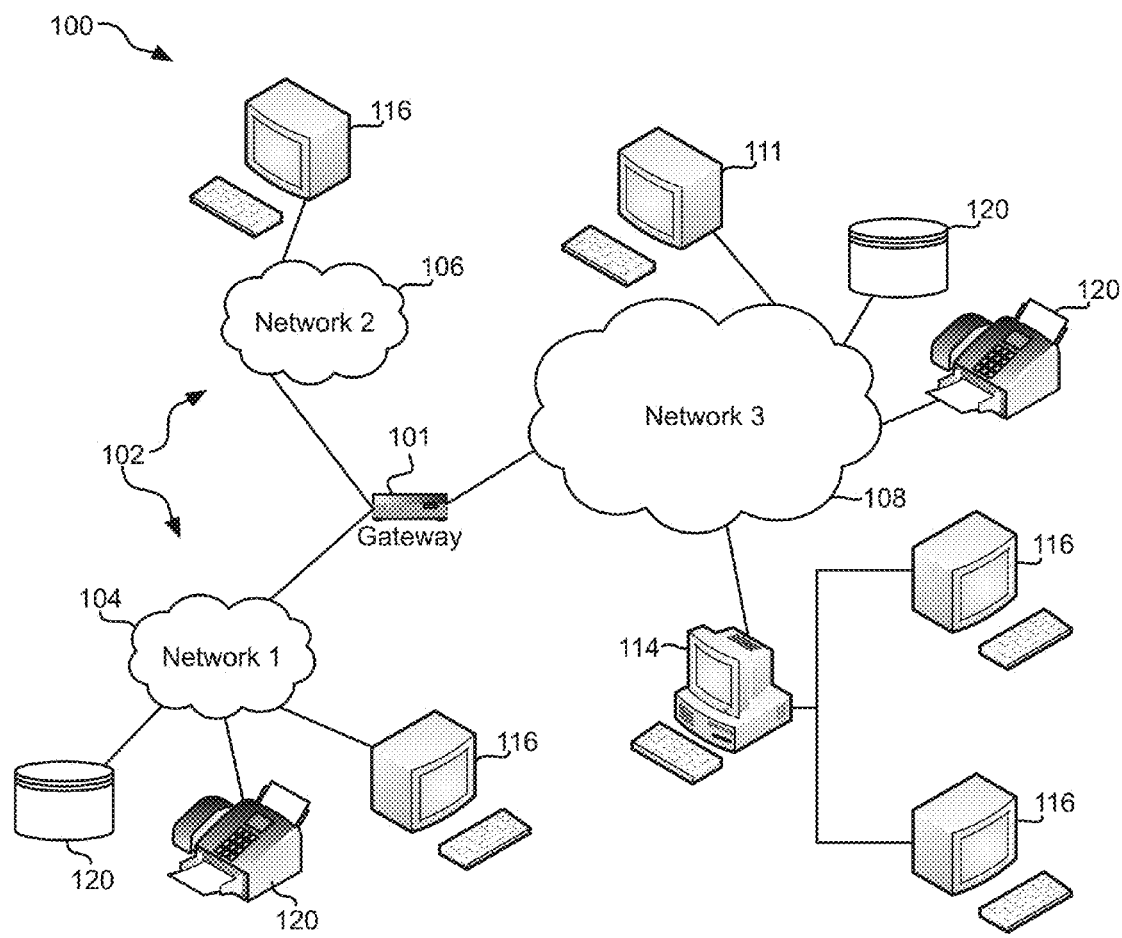
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
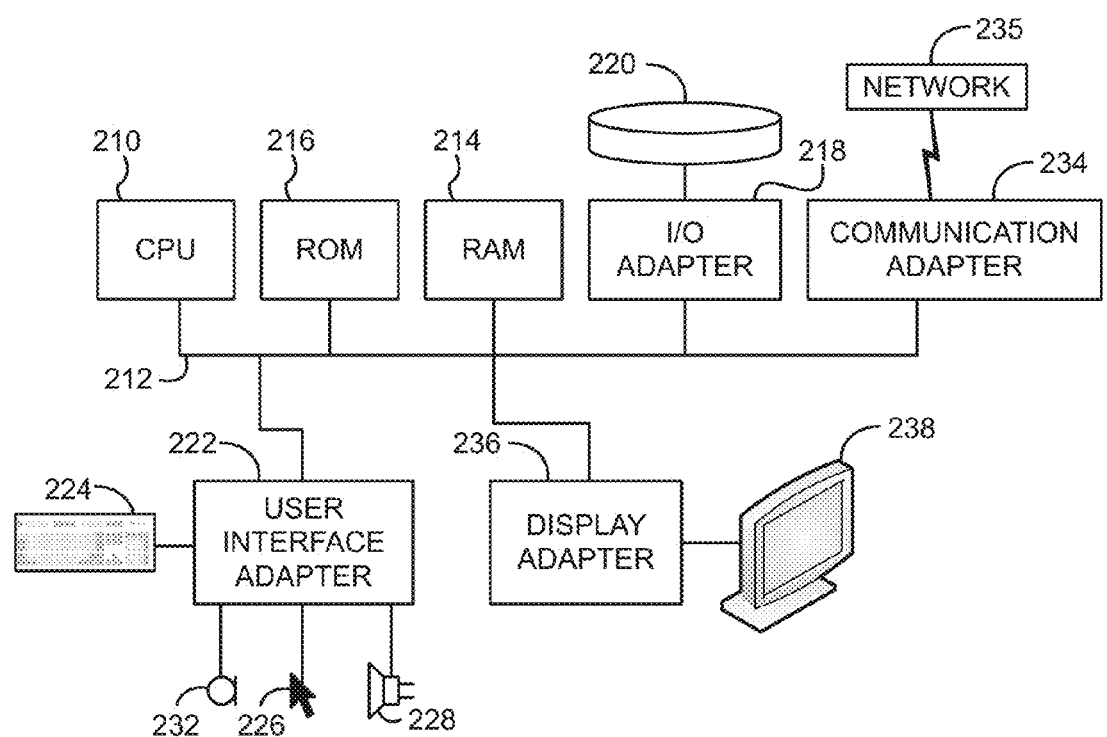
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing according to the presently disclosed algorithms may be subjected to any image processing operations disclosed in the aforementioned Patent Application, such as page detection, rectangularization, detection of uneven illumination, illumination normalization, resolution estimation, blur detection, etc.

In more approaches, the presently disclosed methods, systems, and/or computer program products may be utilized with, implemented in, and/or include one or more user interfaces configured to facilitate performing any functionality disclosed herein and/or in the aforementioned related Patent Application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related Patent Application, among others that would be appreciated by one having ordinary skill in the art upon reading these descriptions.

It will further be appreciated that embodiments presented herein may be provided in the form of a service deployed on behalf of a customer to offer service on demand.

Document Classification

Figure 4C:
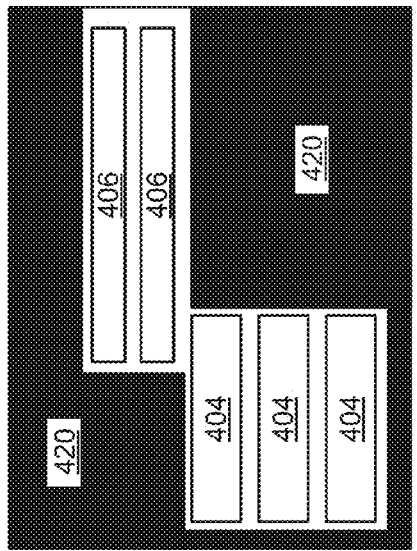
FIG. 4C is a masked representation of the digital image shown in FIG. 4A, according to one embodiment.
Figure 4D:
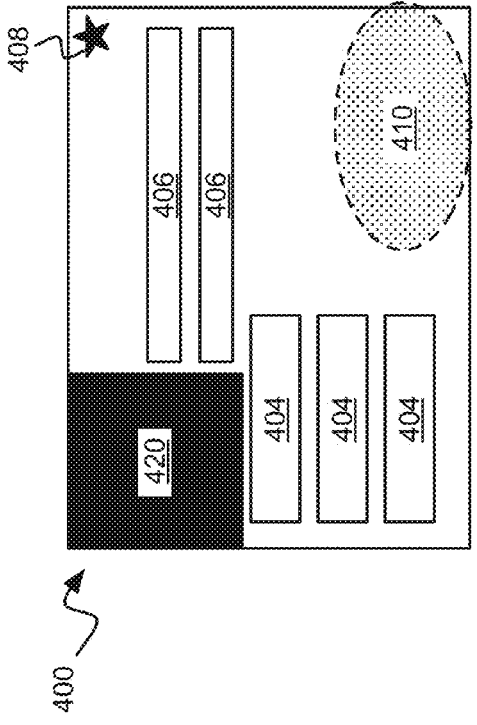
FIG. 4D is a masked representation of the digital image shown in FIG. 4A, according to one embodiment.
Figure 4A:
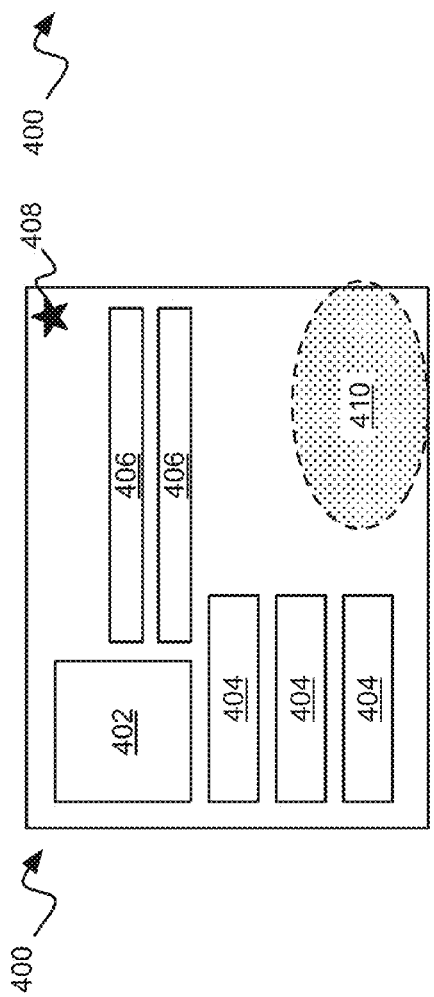
FIG. 4A is a schematic representation of a plurality of subregions depicted in a digital image of a document, according to one embodiment.
Figure 4B:
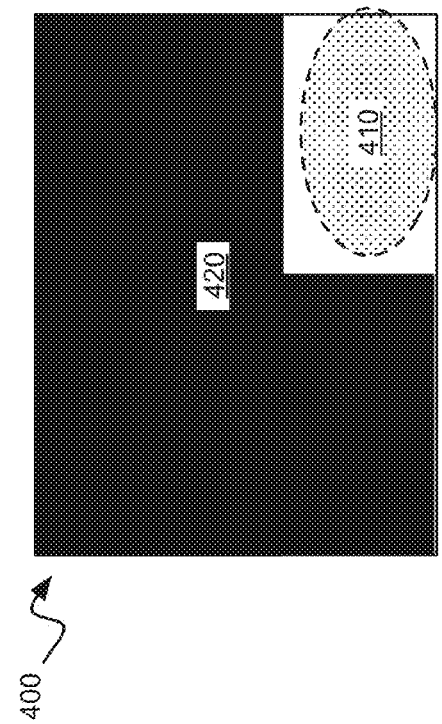
FIG. 4B is a masked representation of the digital image shown in FIG. 4A, according to one embodiment.
Figure 5:
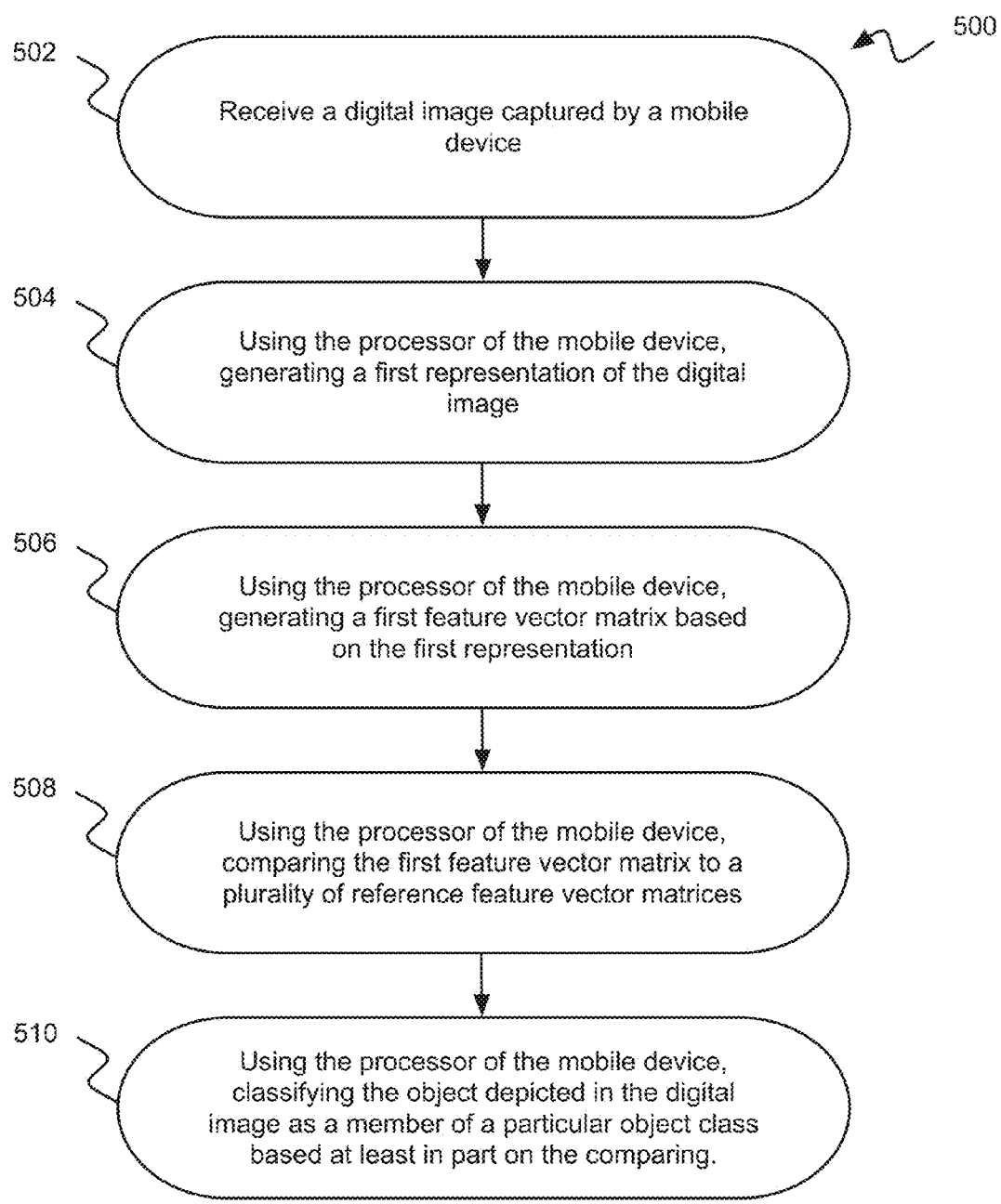
FIG. 5 is a flowchart of a method, according to one embodiment.

In accordance with one inventive embodiment commensurate in scope with the present disclosures, as shown in FIG. 5, a method 500 is shown. The method 500 may be carried out in any desired environment, and may include embodiments and/or approaches described in relation to FIGS. 1-4D, among others. Of course, more or less operations than those shown in FIG. 5 may be performed in accordance method 500 as would be appreciated by one of ordinary skill in the art upon reading the present descriptions.

In operation 502, a digital image captured by a mobile device is received.

In one embodiment the digital image may be characterized by a native resolution. As understood herein, a "native resolution" may be an original, native resolution of the image as originally captured, but also may be a resolution of the digital image after performing some pre-classification processing such as any of the image processing operations described above and in copending U.S. patent application Ser. No. 13/740,123, filed Jan. 11, 2013, a virtual re-scan (VRS) processing as disclosed in related U.S. Pat. No. 6,370,277, etc. as would be understood by one having ordinary skill in the art upon reading the present descriptions. In one embodiment, the native resolution is approximately 500 pixels by 600 pixels (i.e. a 500×600 digital image) for a digital image of a driver license subjected to processing by VRS before performing classification. Moreover, the digital image may be characterized as a color image in some approaches, and in still more approaches may be a cropped-color image, i.e. a color image depicting substantially only the object to be classified, and not depicting image background.

In operation 504, a first representation of the digital image is generated using a processor of the mobile device. The first representation may be characterized by a reduced resolution, in one approach. As understood herein, a "reduced resolution" may be any resolution less than the native resolution of the digital image, and more particularly any resolution suitable for subsequent analysis of the first representation according to the principles set forth herein.

In preferred embodiments, the reduced resolution is sufficiently low to minimize processing overhead and maximize computational efficiency and robustness of performing the algorithm on the respective mobile device, host device and/or server platform. For example, in one approach the first representation is characterized by a resolution of about 25 pixels by 25 pixels, which has been experimentally determined to be a particularly efficient and robust reduced resolution for processing of relatively small documents, such as business cards, driver licenses, receipts, etc. as would be understood by one having ordinary skill in the art upon reading the present descriptions.

Of course, in other embodiments, different resolutions may be employed without departing from the scope of the present disclosure. For example, classification of larger documents or objects may benefit from utilizing a higher resolution such as 50 pixels by 50 pixels, 100 pixels by 100 pixels, etc. to better represent the larger document or object for robust classification and maximum computational efficiency. The resolution utilized may or may not have the same number of pixels in each dimension. Moreover, the most desirable resolution for classifying various objects within a broad range of object classes may be determined experimentally according to a user's preferred balance between computational efficiency and classification robustness. In still more embodiments, any resolution may be employed, and preferably the resolution is characterized by comprising between 1 pixel and about 1000 pixels in a first dimension, and between 1 and about 1000 pixels in a second dimension.

Figure 3A:
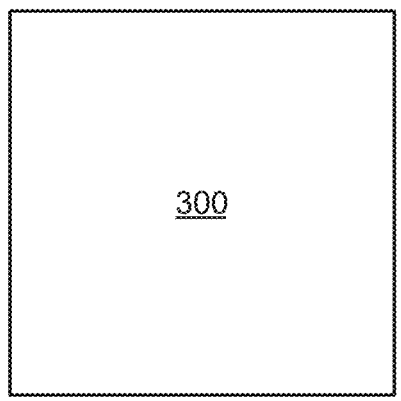
FIG. 3A depicts a digital image of an object, according to one embodiment
Figure 3B:
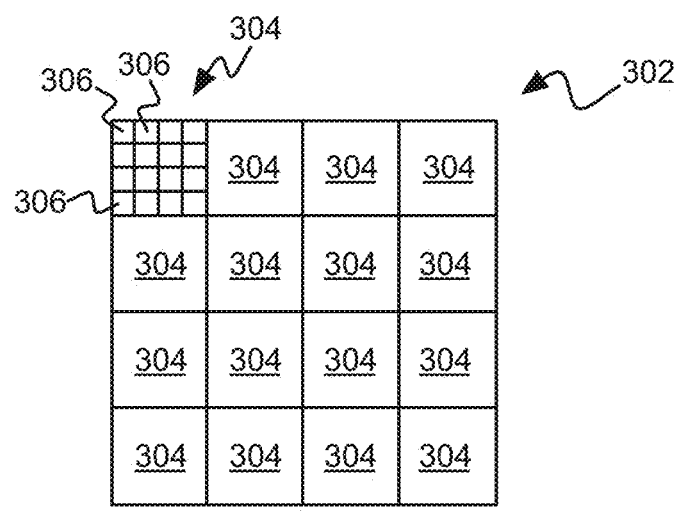
FIG. 3B depicts a schematic representation of the digital image shown in FIG. 3A divided into a plurality of sections for generating a first representation of the digital image, according to one embodiment.
Figure 3C:
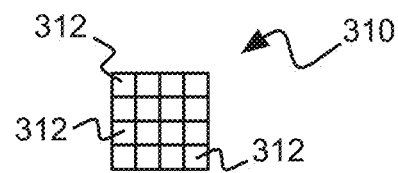
FIG. 3C is depicts a first representation of the digital image shown in FIG. 3A, the first representation being characterized by a reduced resolution relative to the resolution of the digital image.

One exemplary embodiment of inputs, outputs and/or results of a process flow for generating the first representation will now be presented with particular reference to FIGS. 3A-3C, which respectively depict: a digital image before being divided into sections (e.g. digital image 300 as shown in FIG. 3A); a digital image divided into sections (e.g. sections 304 as shown in FIG. 3B); and a first representation of the digital image (e.g. representation 310 as shown in FIG. 3C) characterized by a reduced resolution.

As shown in FIGS. 3A-3B, a digital image 300 captured by a mobile device may be divided into a plurality of sections 304. Each section may comprise a plurality of pixels 306, which may comprise a substantially rectangular grid of pixels such that the section has dimensions of $ps_{(x)}$ horizontal pixels ($ps_{(x)}$=4 as shown in FIG. 3B) by $ps_{(y)}$ vertical pixels ($ps_{(y)}$=4 as shown in FIG. 3B).

In one general embodiment, a method includes receiving or capturing a digital image using a mobile device; using a processor of the mobile device to: determine whether an object depicted in the digital image belongs to a particular object class among a plurality of object classes; determine one or more object features of the object based at least in part on the particular object class at least partially in response to determining the object belongs to the particular object class; build or select an extraction model based at least in part on the one or more determined object features; and extract data from the digital image using the extraction model.

In another general embodiment, a method includes receiving or capturing a digital image using a mobile device; and using a processor of the mobile device: determining whether an object depicted in the digital image belongs to a particular object class among a plurality of object classes; displaying the digital image on a display of the mobile device upon determining the object does not belong to any of the plurality of object classes; receiving user input via the display of the mobile device, the user input identifying one or more regions of interest in the object; building and/or selecting an extraction model based at least in part on the user input; and extracting data from the digital image based at least in part on the extraction model.

In yet another general embodiment, a computer program product includes a computer readable storage medium having program code embodied therewith, the program code readable/executable by a processor to: receive a digital image captured by a mobile device; determine whether an object depicted in the digital image belongs to a particular object class among a plurality of object classes; determine one or more object features of the object based at least in part on the particular object class upon determining the object belongs to the particular object class; build or select an extraction model based at least in part on the one or more object features; and extract data from the digital image based at least in part on the extraction model.

A first representation may be generated by dividing a digital image R (having a resolution of $x_R$ pixels by $y_R$ pixels) into $S_x$ horizontal sections and $S_y$ vertical sections and thus may be characterized by a reduced resolution r of $S_x$ pixels by $S_y$ pixels. Thus, generating the first representation essentially includes generating a less-granular representation of the digital image.

For example, in one approach the digital image 300 is divided into S sections, each section 304 corresponding to one portion of an s-by-s grid 302. Generating the first representation involves generating a s-pixel-by-s-pixel first representation 310, where each pixel 312 in the first representation 310 corresponds to one of the S sections 304 of the digital image, and wherein each pixel 312 is located in a position of the first representation 310 corresponding to the location of the corresponding section 304 in the digital image, i.e. the upper-leftmost pixel 312 in the first representation corresponds to the upper-leftmost section 304 in the digital image, etc.

Of course, other reduced resolutions may be employed for the first representation, ideally but not necessarily according to limitations and/or features of a mobile device, host device, and or server platform being utilized to carry out the processing, the characteristics of the digital image (resolution, illumination, presence of blur, etc.) and/or characteristics of the object which is to be detected and/or classified (contrast with background, presence of text or other symbols, closeness of fit to a general template, etc.) as would be understood by those having ordinary skill in the art upon reading the present descriptions.

In some approaches, generating the first representation may include one or more alternative and/or additional sub-operations, such as dividing the digital image into a plurality of sections. The digital image may be divided into a plurality of sections in any suitable manner, and in one embodiment the digital image is divided into a plurality of rectangular sections. Of course, sections may be characterized by any shape, and in alternative approaches the plurality of sections may or may not represent the entire digital image, may represent an oversampling of some regions of the image, or may represent a single sampling of each pixel depicted in the digital image. In a preferred embodiment, as discussed above regarding FIGS. 3A-3C, the digital image is divided into S substantially square sections 304 to form an s×s grid 302.

In further approaches, generating the first representation may also include determining, for each section of the digital image, at least one characteristic value, where each characteristic value corresponds to one or more features descriptive of the section. Within the scope of the present disclosures, any feature that may be expressed as a numerical value is suitable for use in generating the first representation, e.g. an average brightness or intensity (0-255) across each pixel in the section, an average value (0-255) of each color channel of each pixel in the section, such as an average red-channel value, and average green-channel value, and an average blue-channel value for a red-green-blue (RGB) image, etc. as would be understood by one having ordinary skill in the art upon reading the present descriptions.

With continuing reference to FIGS. 3A-3C, in some embodiments each pixel 312 of the first representation 310 corresponds to one of the S sections 304 not only with respect to positional correspondence, but also with respect to feature correspondence. For example, in one approach generating the first representation 310 may additionally include determining a characteristic section intensity value $i_S$ by calculating the average of the individual intensity values $i_P$ of each pixel 306 in the section 304. Then, each pixel 312 in the first representation 310 is assigned an intensity value equal to the average intensity value $i_S$ calculated for the corresponding section 304 of the digital image 300. In this manner, the first representation 310 reflects a less granular, normalized representation of the features depicted in digital image 300.

Of course, the pixels 312 comprising the first representation 310 may be represented using any characteristic value or combination of characteristic values without departing from the scope of the presently disclosed classification methods. Further, characteristic values may be computed and/or determined using any suitable means, such as by random selection of a characteristic value from a distribution of values, by a statistical means or measure, such as an average value, a spread of values, a minimum value, a maximum value, a standard deviation of values, a variance of values, or by any other means that would be known to a skilled artisan upon reading the instant descriptions.

In operation 506, a first feature vector is generated based on the first representation.

The first feature vector and/or reference feature matrices may include a plurality of feature vectors, where each feature vector corresponds to a characteristic of a corresponding object class, e.g. a characteristic minimum, maximum, average, etc. brightness in one or more color channels at a particular location (pixel or section), presence of a particular symbol or other reference object at a particular location, dimensions, aspect ratio, pixel density (especially black pixel density, but also pixel density of any other color channel), etc.

As would be understood by one having ordinary skill in the art upon reading the present descriptions, feature vectors suitable for inclusion in first feature vector and/or reference feature matrices comprise any type, number and/or length of feature vectors, such as described in U.S. patent application Ser. No. 12/042,774, filed Mar. 5, 2008; and Ser. No. 12/368,685, filed Feb. 10, 2009 and/or U.S. Pat. No. 7,761,391, granted Jul. 20, 2010 (U.S. patent application Ser. No. 11/752,364, filed May 13, 2007).

In operation 508, the first feature vector is compared to a plurality of reference feature matrices.

The comparing operation 508 may be performed according to any suitable vector matrix comparison, such as described in U.S. patent application Ser. No. 12/042,774, filed Mar. 5, 2008; and Ser. No. 12/368,685, filed Feb. 10, 2009 and U.S. Pat. No. 7,761,391, granted Jul. 20, 2010 (U.S. patent application Ser. No. 11/752,364, filed May 13, 2007).

Thus, in such approaches the comparing may include an N-dimensional feature space comparison. In at least one approach, N is greater than 50, but of course. N may be any value sufficiently large to ensure robust classification of objects into a single, correct object class, which those having ordinary skill in the art reading the present descriptions will appreciate to vary according to many factors, such as the complexity of the object, the similarity or distinctness between object classes, the number of object classes, etc.

As understood herein, "objects" include any tangible thing represented in an image and which may be described according to at least one unique object feature or characteristic such as color, size, dimensions, shape, texture, brightness, intensity, presence or absence of one or more representative mark(s) or other features, location of one or more representative mark(s) or other features, positional relationship between a plurality of representative mark(s) or other features, etc. as would be understood by one having ordinary skill in the art upon reading the present descriptions. Additionally, objects include any tangible thing represented in an image and which may be classified according to at least one unique combination of such characteristics. For example, in various embodiments objects may include but are in no way limited to persons, animals, vehicles, buildings, landmarks, documents, furniture, plants, etc. as would be understood by one having ordinary skill in the art upon reading the present descriptions.

For example, in one embodiment where attempting to classify an object depicted in a digital image as one of only a small number of object classes (e.g. 3-5 object classes), each object class being characterized by a significant number of starkly distinguishing features or feature vectors (e.g. each object class corresponding to an object or object(s) characterized by very different size, shape, color profile and/or color scheme and easily distinguishable reference symbols positioned in unique locations on each object class, etc.), a relatively low value of N may be sufficiently large to ensure robust classification.

On the other hand, where attempting to classify an object depicted in a digital image as one of a large number of object classes (e.g. 30 or more object classes), and each object class is characterized by a significant number of similar features or feature vectors, and only a few distinguishing features or feature vectors, a relatively high value of N may be preferable to ensure robust classification. Similarly, the value of N is preferably chosen or determined such that the classification is not only robust, but also computationally efficient; i.e. the classification process(es) introduce only minimal processing overhead to the device(s) or system(s) utilized to perform the classification algorithm.

The value of N that achieves the desired balance between classification robustness and processing overhead will depend on many factors such as described above and others that would be appreciated by one having ordinary skill in the art upon reading the present descriptions. Moreover, determining the appropriate value of N to achieve the desired balance may be accomplished using any known method or equivalent thereof as understood by a skilled artisan upon reading the instant disclosures.

In a concrete implementation, directed to classifying driver licenses according to state and distinguishing driver licenses from myriad other document types, it was determined that a 625-dimensional comparison (N=625) provided a preferably robust classification without introducing unsatisfactorily high overhead to processing performed using a variety of current-generation mobile devices.

In operation 510, an object depicted in the digital image is classified as a member of a particular object class based at least in part on the comparing operation 508. More specifically, the comparing operation 508 may involve evaluating each feature vector of each reference list of feature vectors and/or feature matrix, or alternatively evaluating a plurality of feature matrices for objects belonging to a particular object class, and identifying a hyper-plane in the N-dimensional feature space that separates the feature vectors of one reference list of feature vectors and/or feature matrix from the feature vectors of other reference feature matrices. In this manner, the classification algorithm defines concrete hyper-plane boundaries between object classes, and may assign an unknown object to a particular object class based on similarity of feature vectors to the particular object class and/or dissimilarity to other reference list of feature vectors and/or feature matrix profiles.

In the simplest example of such feature-space discrimination, imagining a two-dimensional feature space with one feature plotted along the ordinate axis and another feature plotted along the abscissa, objects belonging to one particular class may be characterized by feature vectors having a distribution of values clustered in the lower-right portion of the feature space, while another class of objects may be characterized by feature vectors exhibiting a distribution of values clustered in the upper-left portion of the feature space, and the classification algorithm may distinguish between the two by identifying a line between each cluster separating the feature space into two classes—"upper left" and "lower-right." Of course, as the number of dimensions considered in the feature space increases, the complexity of the classification grows rapidly, but also provides significant improvements to classification robustness, as will be appreciated by one having ordinary skill in the art upon reading the present descriptions.

Additional Processing

In some approaches, classification according to embodiments of the presently disclosed methods may include one or more additional and/or alternative features and/or operations, such as described below.

In one embodiment, classification such as described above may additionally and/or alternatively include assigning a confidence value to a plurality of putative object classes based on the comparing operation (e.g. as performed in operation 508 of method 500) the presently disclosed classification methods, systems and/or computer program products may additionally and/or alternatively determine a location of the mobile device, receive location information indicating the location of the mobile device, etc. and based on the determined location, a confidence value of a classification result corresponding to a particular location may be adjusted. For example, if a mobile device is determined to be located in a particular state (e.g. Maryland) based on a GPS signal, then during classification, a confidence value may be adjusted for any object class corresponding to the particular state (e.g. Maryland Driver License, Maryland Department of Motor Vehicle Title/Registration Form, Maryland Traffic Violation Ticket, etc. as would be understood by one having ordinary skill in the art upon reading the present descriptions).

Confidence values may be adjusted in any suitable manner, such as increasing a confidence value for any object class corresponding to a particular location, decreasing a confidence value for any object class not corresponding to a particular location, normalizing confidence value(s) based on correspondence/non-correspondence to a particular location, etc. as would be understood by the skilled artisan reading the present disclosures.

The mobile device location may be determined using any known method, and employing hardware components of the mobile device or any other number of devices in communication with the mobile device, such as one or more satellites, wireless communication networks, servers. etc. as would be understood by one having ordinary skill in the art upon reading the present descriptions.

For example, the mobile device location may be determined based in whole or in part on one or more of a global-positioning system (GPS) signal, a connection to a wireless communication network, a database of known locations (e.g. a contact database, a database associated with a navigational tool such as Google Maps, etc.), a social media tool (e.g. a "check-in" feature such as provided via Facebook, Google Plus, Yelp, etc.), an IP address, etc. as would be understood by one having ordinary skill in the art upon reading the present descriptions.

In more embodiments, classification additionally and/or alternatively includes outputting an indication of the particular object class to a display of the mobile device; and receiving user input via the display of the mobile device in response to outputting the indication. While the user input may be of any known type and relate to any of the herein described features and/or operations, preferably user input relates to confirming, negating or modifying the particular object class to which the object was assigned by the classification algorithm.

The indication may be output to the display in any suitable manner, such as via a push notification, text message, display window on the display of the mobile device, email, etc. as would be understood by one having ordinary skill in the art. Moreover, the user input may take any form and be received in any known manner, such as detecting a user tapping or pressing on a portion of the mobile device display (e.g. by detecting changes in resistance, capacitance on a touch-screen device, by detecting user interaction with one or more buttons or switches of the mobile device, etc.).

In one embodiment, classification further includes determining one or more object features of a classified object based at least in part on the particular object class. Thus, classification may include determining such object features using any suitable mechanism or approach, such as receiving an object class identification code and using the object class identification code as a query and/or to perform a lookup in a database of object features organized according to object class and keyed, hashed, indexed, etc. to the object class identification code.

Object features within the scope of the present disclosures may include any feature capable of being recognized in a digital image, and preferably any feature capable of being expressed in a numerical format (whether scalar, vector, or otherwise), e.g. location of subregion containing reference object(s) (especially in one or more object orientation states, such as landscape, portrait, etc.) object color profile, or color scheme, object subregion color profile or color scheme, location of text. etc. as would be understood by one having ordinary skill in the art upon reading the present descriptions.

Figure 6:
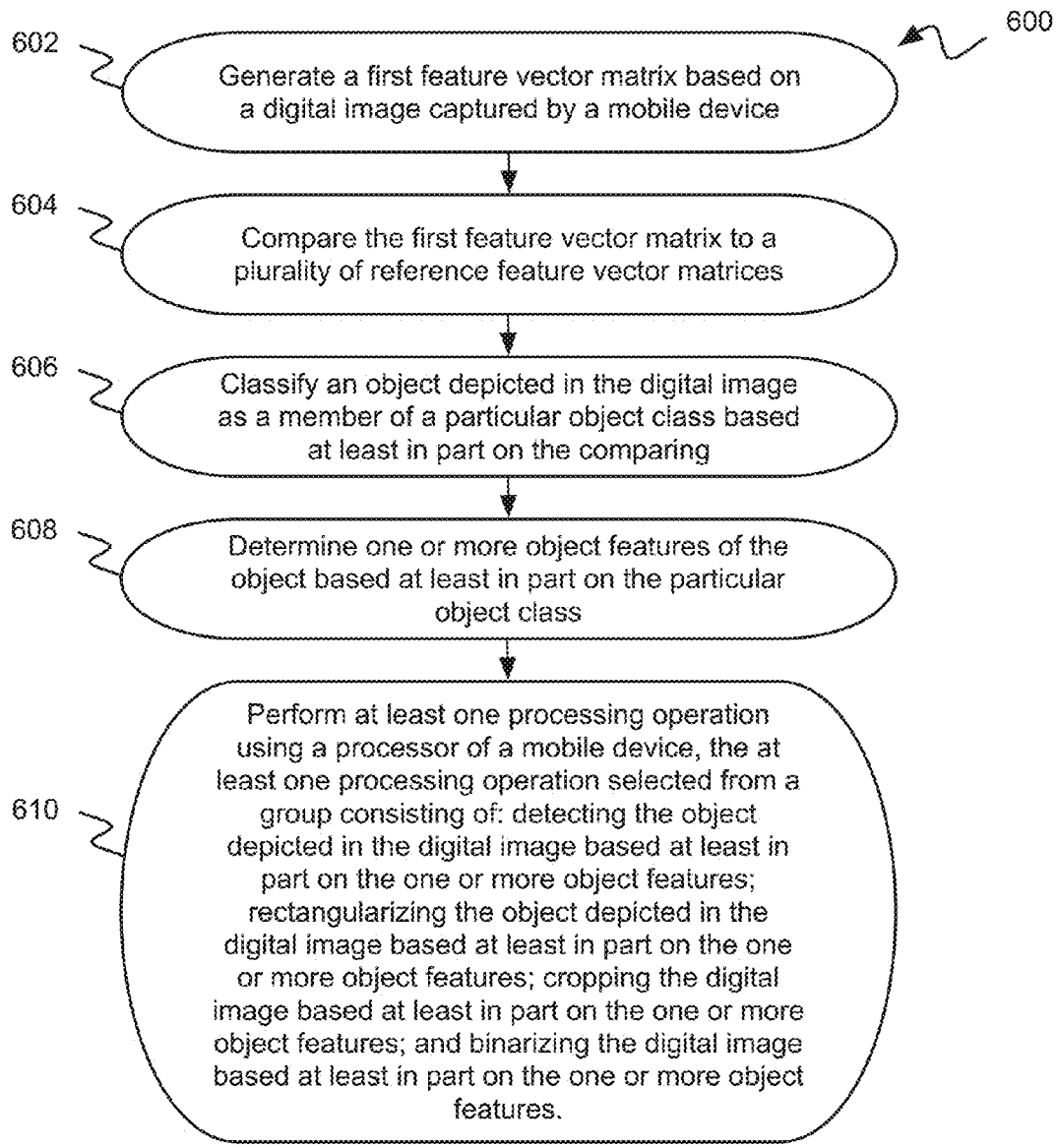
FIG. 6 is a flowchart of a method, according to one embodiment.

In accordance with another inventive embodiment commensurate in scope with the present disclosures, as shown in FIG. 6, a method 600 is shown. The method 600 may be carried out in any desired environment, and may include embodiments and/or approaches described in relation to FIGS. 1-4D, among others. Of course, more or less operations than those shown in FIG. 6 may be performed in accordance method 600 as would be appreciated by one of ordinary skill in the art upon reading the present descriptions.

In operation 602, a first feature vector is generated based on a digital image captured by a mobile device.

In operation 604, the first feature vector is compared to a plurality of reference feature matrices.

In operation 606, an object depicted in the digital image is classified as a member of a particular object class based at least in part on the comparing (e.g. the comparing performed in operation 604).

In operation 608, one or more object features of the object are determined based at least in part on the particular object class.

In operation 610, a processing operation is performed. The processing operation includes performing one or more of the following subprocesses: detecting the object depicted in the digital image based at least in part on the one or more object features; rectangularizing the object depicted in the digital image based at least in part on the one or more object features; cropping the digital image based at least in part on the one or more object features; and binarizing the digital image based at least in part on the one or more object features.

As will be further appreciated by one having ordinary skill in the art upon reading the above descriptions of document classification, in various embodiments it may be advantageous to perform one or more additional processing operations, such as the subprocesses described above with reference to operation 610, on a digital image based at least in part on object features determined via document classification.

For example, after classifying an object depicted in a digital image, such as a document, it may be possible to refine other processing parameters, functions, etc. and/or utilize information known to be true for the class of objects to which the classified object belongs, such as object shape, size, dimensions, location of regions of interest on and/or in the object, such as regions depicting one or more symbols, patterns, text, etc. as would be understood by one having ordinary skill in the art upon reading the present descriptions.

Regarding performing page detection based on classification, it may be advantageous in some approaches to utilize information known about an object belonging to a particular object class in order to improve object detection capabilities. For example, and as would be appreciated by one having ordinary skill in the art, it may be less computationally expensive, and/or may result in a higher-confidence or higher-quality result to narrow a set of characteristics that may potentially identify an object in a digital image to one or a few discrete, known characteristics, and simply search for those characteristic(s).

Exemplary characteristics that may be utilized to improve object detection may include characteristics such as object dimensions, object shape, object color, one or more reference features of the object class (such as reference symbols positioned in a known location of a document).

In another approach, object detection may be improved based on the one or more known characteristics by facilitating an object detection algorithm distinguishing regions of the digital image depicting the object from regions of the digital image depicting other objects, image background, artifacts, etc. as would be understood by one having ordinary skill in the art upon reading the present descriptions. For example, if objects belonging to a particular object class are known to exhibit a particular color profile or scheme, it may be simpler and/or more reliable to attempt detecting the particular color profile or scheme within the digital image rather than detecting a transition from one color profile or scheme (e.g. a background color profile or scheme) to another color profile or scheme (e.g. the object color profile or scheme), especially if the two colors profiles or schemes are not characterized by sharply contrasting features.

Regarding performing rectangularization based on classification, it may be advantageous in some approaches to utilize information known about an object belonging to a particular object class in order to improve object rectangularization capabilities. For example, and as would be appreciated by one having ordinary skill in the art, it may be less computationally expensive, and/or may result in a higher-confidence or higher-quality result to transform a digital representation of an object from a native appearance to a true configuration based on a set of known object characteristics that definitively represent the true object configuration, rather than attempting to estimate the true object configuration from the native appearance and project the native appearance onto an estimated object configuration.

In one approach, the classification may identify known dimensions of the object, and based on these known dimensions the digital image may be rectangularized to transform a distorted representation of the object in the digital image into an undistorted representation (e.g. by removing projective effects introduced in the process of capturing the image using a camera of a mobile device rather than a traditional flat-bed scanner, paper-feed scanner or other similar multi-function peripheral (MFP)).

Regarding performing cropping based on classification, and similar to the principles discussed above regarding rectangularization, it may be advantageous in some approaches to utilize information known about an object belonging to a particular object class to improve cropping of digital images depicting the object such that all or significantly all of the cropped image depicts the object and not image background (or other objects, artifacts, etc. depicted in the image).

As a simple example, it may be advantageous to determine an object's known size, dimensions, configuration, etc. according to the object classification and utilize this information to identify a region of the image depicting the object from regions of the image not depicting the object, and define crop lines surrounding the object to remove the regions of the image not depicting the object.

Regarding performing binarization based on classification, the presently disclosed classification algorithms provide several useful improvements to mobile image processing. Several exemplary embodiments of such improvements will now be described with reference to FIGS. 4A-4D.

For example, binarization algorithms generally transform a multi-tonal digital image (e.g. grayscale, color, or any other image such as image 400 exhibiting more than two tones) into a bitonal image, i.e. an image exhibiting only two tones (typically white and black). Those having ordinary skill in the art will appreciate that attempting to binarize a digital image depicting an object with regions exhibiting two or more distinct color profiles and/or color schemes (e.g. a region depicting a color photograph 402 as compared to a region depicting a black/white text region 404, a color-text region 406, a symbol 408 such as a reference object, watermark, etc. object background region 410, etc.) may produce an unsuccessful or unsatisfactory result.

As one explanation, these difficulties may be at least partially due to the differences between the color profiles, schemes, etc., which counter-influence a single binarization transform. Thus, providing an ability to distinguish each of these regions having disparate color schemes or profiles and define separate binarization parameters for each may greatly improve the quality of the resulting bitonal image as a whole and with particular respect to the quality of the transformation in each respective region.

According to one exemplary embodiment shown in FIGS. 4A-4B, improved binarization may include determining an object class color profile and/or scheme (e.g. determining a color profile and/or color scheme for object background region 410); adjusting one or more binarization parameters based on the object class color profile and/or color scheme; and thresholding the digital image using the one or more adjusted binarization parameters.

Binarization parameters may include any parameter of any suitable binarization process as would be appreciated by those having ordinary skill in the art reading the present descriptions, and binarization parameters may be adjusted according to any suitable methodology. For example, with respect to adjusting binarization parameters based on an object class color profile and/or color scheme, binarization parameters may be adjusted to over- and/or under-emphasize a contribution of one or more color channels, intensities, etc. in accordance with the object class color profile/scheme (such as under-emphasizing the red channel for an object class color profile/scheme relatively saturated by red hue(s), etc.).

Similarly, in other embodiments such as particularly shown in FIGS. 4B-4D, improved binarization may include determining an object class mask, applying the object class mask to the digital image and thresholding a subregion of the digital image based on the object class mask. The object class mask may be any type of mask, with the condition that the object class mask provides information regarding the location of particular regions of interest characteristic to objects belonging to the class (such as a region depicting a color photograph 402, a region depicting a black/white text region 404, a color-text region 406, a symbol region depicting a symbol 408 such as a reference object, watermark, etc., an object background region 410, etc.) and enabling the selective inclusion and/or exclusion of such regions from the binarization operation(s).

For example, as shown in FIG. 4B, improved binarization includes determining an object class mask 420 identifying regions such as discussed immediately above and applying the object class mask 420 to exclude from binarization all of the digital image 400 except a single region of interest, such as object background region 410. Alternatively the entire digital image may be masked-out and a region of interest such as object background region 410 subsequently masked-in to the binarization process. Moreover, in either event the masking functionality now described with reference to FIG. 4B may be combined with the exemplary color profile and/or color scheme information functionality described above, for example by obtaining both the object class mask and the object color profile and/or color scheme, applying the object class mask to exclude all of the digital image from binarization except object background region 410, adjusting one or more binarization parameters based on the object background region color profile and/or color scheme, and thresholding the object background region 410 using the adjusted binarization parameters.

Extending the principle shown in FIG. 4B, multiple regions of interest may be masked-in and/or masked-out using object class mask 420 to selectively designate regions and/or parameters for binarization in a layered approach designed to produce high-quality bitonal images. For example, as shown in FIG. 4C multiple text regions 404, 406 may be retained for binarization (potentially using adjusted parameters) after applying object class mask 420, for example to exclude all non-text regions from binarization, in some approaches.

Similarly, it may be advantageous to simply exclude only a portion of an image from binarization, whether or not adjusting any parameters. For example, with reference to FIG. 4D, it may be desirable to mask-out a unique region of a digital image 400, such as a region depicting a color photograph 402, using an object class mask 420. Then, particularly in approaches where the remaining portion of the digital image 400 is characterized by a single color profile and/or color scheme, or a small number (i.e. no more than 3) substantially similar color profile and/or color schemes, binarization may be performed to clarify the remaining portions of the digital image 400. Subsequently, the masked-out unique region may optionally be restored to the digital image 400, with the result being an improved bitonal image quality in all regions of the digital image 400 that were subjected to binarization coupled with an undisturbed color photograph 402 in the region of the image not subjected to binarization.

In still more embodiments, it may be advantageous to perform optical character recognition (OCR) based at least in part on the classification and/or result of classification. Specifically, it may be advantageous to determine information about the location, format, and/or content of text depicted in objects belonging to a particular class, and modify predictions estimated by traditional OCR methods based on an expected text location, format and/or content. For example, in one embodiment where an OCR prediction estimates text in a region corresponding to a "date" field of a document reads "Jan. 14, 2011" the presently disclosed algorithms may determine the expected format for this text follows a format such as "[Abbreviated Month][.][##][,] [####]" the algorithm may correct the erroneous OCR predictions, e.g. converting the comma after "Jan" into a period and/or converting the letter "l" at the end of 2011" into a numerical one character. Similarly, the presently disclosed algorithms may determine the expected format for the same text is instead "[##]/[##]/[####]" and convert "Jan" to "01" and convert each set of comma-space characters "," into a slash "/" to correct the erroneous OCR predictions.

Of course, other methods of improving upon and/or correcting OCR predictions that would be appreciated by the skilled artisan upon reading these descriptions are also fully within the scope of the present disclosure.

Data Extraction

In addition to performing improved image processing based on object classification, a user may wish to gather information about one or more objects depicted in a digital image. In several embodiments, it is advantageous to leverage object classification for the purposes of extracting data from digital images. As described in further detail below, the presently disclosed methods, systems and computer program products thus include functionality for extracting data from digital images based on object classification.

The data extraction embodiments discussed herein may utilize one or more of the functionalities disclosed in related U.S. patent application Ser. No. 12/042,774, filed Mar. 5, 2008; and Ser. No. 12/368,685, filed Feb. 10, 2009, and U.S. Pat. No. 7,761,391, granted Jul. 20, 2010 (U.S. patent application Ser. No. 11/752,364, filed May 13, 2007) each of which is herein incorporated by reference in its entirety. For example, the presently disclosed embodiments of data extraction may utilize one or more of support-vector-machine (SVM) techniques, learn-by-example (LBE) techniques, feature vectors, feature matrices, document validation techniques, dataset organization techniques, transductive classification techniques, maximum entropy discrimination (MED) techniques, etc. as disclosed therein.

Figure 7:
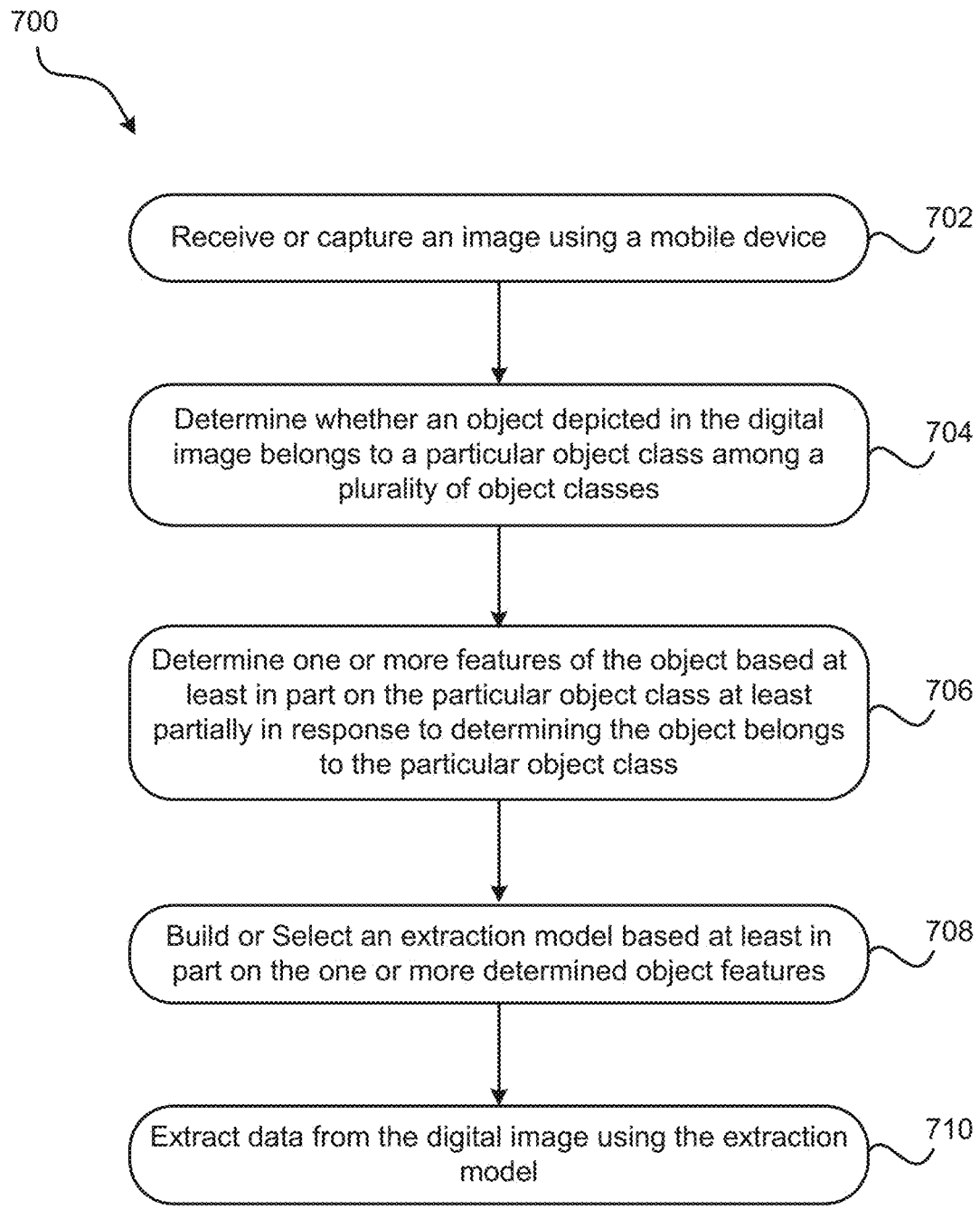
FIG. 7 is a flowchart of a method, according to one embodiment.

Referring now to FIG. 7, a method 700 is shown, according to one embodiment. The method may be performed in any suitable environment and/or utilizing any suitable mechanism(s), including those depicted in FIGS. 1-4D, in various approaches.

In one approach, method 700 includes operation 702, where a digital image captured by a mobile device is received. The digital image may be received and/or stored in a memory of the mobile device or another mobile device, in some embodiments. Moreover, the digital image may be received from a variety of sources, such as a component of the mobile device including a camera, a memory, wireless receiver, antenna, etc. as would be understood by one having ordinary skill in the art upon reading the present descriptions. In other approaches, the digital image may be received from a remote device, such as a remote server, another mobile device, a camera with integrated data transmission capability, a facsimile machine or other multifunction printer, etc. The digital image may optionally be received via an online service, a database, etc. as would be understood by the skilled artisan reading this disclosure.

Method 700 further includes performing operations 704-710 using a processor of the mobile device, which are described in further detail below. As will be understood by one having ordinary skill in the art upon reading the present descriptions, various embodiments of method 700 may involve performing any of operations 704-710 using a processor of a mobile device, a processor of a server, a cloud computing environment, etc. as well as any combination thereof.

In operation 704, the mobile device processor is used to determine whether an object depicted in the digital image belongs to a particular object class among a plurality of object classes. Determining whether the depicted object belongs to a particular object class may be performed using any method as described herein, with particular reference to the object classification methods discussed above with reference to FIGS. 5 and 6.

In operation 706, the mobile device processor is used to determine one or more object features of the object based at least in part on the particular object class. In one embodiment, object features may be determined using a feature vector, feature vector list, feature matrix, and/or extraction model. This determination is made in response to determining the object belongs to the particular object class. As discussed herein, object features include any unique characteristic or unique combination of characteristics sufficient to identify an object among a plurality of possible objects or any unique characteristic or unique combination of characteristics sufficient to identify an object as belonging to a particular object class among a plurality of object classes. For example, in various approaches object features may include object color, size, dimensions, shape, texture, brightness, intensity, presence or absence of one or more representative mark(s) or other features, location of one or more representative mark(s) or other features, positional relationship between a plurality of representative mark(s) or other features, etc. as would be understood by one having ordinary skill in the art upon reading the present descriptions.

In a preferred embodiment, one or more object features comprise one or more regions of interest of the object. As understood herein, a region of interest may include any portion of the object that depicts, represents, contains, etc. information the user desires to extract. Thus, in some approaches one or more of the regions of interest comprise one or more text characters, symbols, photographs, images, etc.

For example, in one instance a user may wish to perform a credit check, apply for a loan or lease, etc. In order to perform the desired action, the user needs to gather data, such as an applicant's name, address, social security number, date of birth, etc. The mobile device may receive a digital image of one or more identifying documents such as a utility bill, driver license, social security card, passport, pay stub, etc. which contains/depicts information relevant to performing the credit check, loan or lease application, etc. In this case, regions of interest may include any portion of the identifying document that depicts relevant data, such as the applicant's name, address, social security number, date of birth, etc.

In another example, a user wishes to make an electronic funds transfer, set up a recurring bill payment, engage in a financial transaction, etc. In this case the user may need to gather data such as an account number, routing number, payee name, address, biller name and/or address, signature, payment amount, payment date and/or schedule, etc. as would be understood by one having ordinary skill in the art upon reading the present descriptions. The mobile device may receive a digital image of one or more financial documents such as a bill, remittance coupon, check, credit card, driver license, social security card, passport, pay stub, etc. which contains/depicts information relevant to performing the credit check, loan or lease application, etc. In this case, regions of interest may include any portion of the identifying document that depicts relevant data, such as the account number, routing number, payee name, address, biller name and/or address, signature, payment amount, payment date and/or schedule, etc.

In still another example, a user wishes to authenticate the identity of an individual applying for motor vehicle registration or a new bank account, etc. The applicant provides a driver license as proof of identification. The user may capture an image of the driver license, and extract data from the image including text information such as a name, address, driver license number, etc. The user may also extract a photograph of the licensee from the image, and compare the extracted photograph to a reference photograph of the licensee. The reference photograph may be retrieved from a local database maintained by the motor vehicle administration office, bank, a database maintained by a government agency, etc. in various approaches. Alternatively, the reference photograph may be a previously obtained photograph of the licensee, for example a photograph obtained during a prior transaction requiring identity authentication. Based on the comparison, the user may be presented an indication of whether the extracted photograph matches the reference photograph, along with an optional confidence score, in one embodiment.

Operation 708 includes using the mobile device processor to build or select an extraction model based at least in part on the one or more object features. In one embodiment, the object class determines the extraction model. As understood herein, an extraction model encompasses any model that may be applied to a digital image in order to extract data therefrom. In a preferred approach, the extraction model comprises a set of instructions and/or parameters for gathering data from a digital image. In a particularly preferred embodiment, the extraction model utilizes a feature vector and/or list of feature vectors and/or feature matrix to generate and/or modify instructions for extracting data from digital images.

For example, in one approach an exemplary data extraction process as described herein is configured to extract data from various forms of identification based on objects and/or object features (as may be embodied in one or more feature vector(s)) thereof. Illustrative forms of identification may include, for example, a plurality of driver's license formats. Moreover, the illustrative IDs may be classified according to one or more distinguishing criteria, such as an issuing entity (state, administrative agency, etc.) to which the ID corresponds. The extraction model may be selected based on determining an ID in question belongs to one of the predetermined categories of ID (e.g. the ID in question is a Maryland driver's license). Preferably, the selected extraction model is built using a plurality of exemplars from the corresponding category/class.

In one exemplary approach, based on the user input identifying the region(s) of interest, operation 708 may include reviewing one or more existing object class definitions to determine whether the determined object features define a pattern that matches, corresponds, or is similar to a pattern defining features of objects belonging to the existing object class. Upon determining the patterns match, correspond or are similar, operation 708 may include selecting an existing extraction model defined for the matching object class, and utilize that extraction model to extract data from the digital image. The existing object class definition and/or extraction model may be retrieved from a memory of the mobile device, a memory in communication with the mobile device, a server, a local or online database, etc. as would be understood by one having ordinary skill in the art upon reading the present descriptions.

Alternatively, operation 708 may include analyzing the image and characteristics thereof to define a feature vector descriptive of the image characteristics. This new feature vector may be used to modify a feature vector, list of feature vectors and/or feature matrix descriptive of the existing object class having the matching, corresponding, or similar pattern of regions of interest. For example, building the extraction model may include mapping the object features to the feature vector, list of feature vectors and/or feature matrix, which may have been modified via the new feature vector as described above. The resulting extraction model is configured to extract data from images depicting objects belonging to the existing object class.

Additionally and/or alternatively, operation 708 may include building a new extraction model based on the object features, in some approaches. More specifically, using the processor of the mobile device, the image is analyzed and characteristics thereof used to define a feature vector and/or list of feature vectors descriptive of the image characteristics. For example, the feature vector(s) may correspond to image characteristics such as pixel brightness and/or intensity in one or more color channels, brightness and/or intensity of one or more neighboring pixels in one or more color channels, positional relationship of pixels in the image or in a subregion of the image, etc. Image analysis and feature vector definition may be performed in any suitable manner, and preferably may be performed substantially as described above regarding "Document Classification" and "Additional Processing." Using the feature vector(s), operation 708 may include building an extraction model configured to extract data corresponding to image characteristics depicted in the region(s) of interest.

In still further embodiments, building an extraction model may include mapping the feature vector, list of feature vectors, and/or feature matrix and associating metadata label(s) with each mapped object feature. In one approach mapping the feature vector, list of feature vectors, and/or feature matrix to object features involves processing the feature vector to determine therefrom pertinent location information, color profile information, etc. for the image.

Metadata labels may include any type of information and be associated with any type of object feature. For example, in some embodiments metadata labels may identify object features according to type of data depicted, such as text, alphanumeric characters, symbols, numeric characters, picture, background, foreground, field, shadow, texture, shape, dimension, color profile or scheme, etc. as would be understood by one having ordinary skill in the art upon reading the present descriptions.

In case of invoices for instance, metadata labels may include text and/or relative or absolute location information. For example, a metadata label may identify text as an invoice number with an absolute location at a bottom right corner of the invoice. Moreover, another metadata label may identify text as an invoice date with a relative location directly below the invoice number address on the invoice, etc.

Additionally and/or alternatively, metadata labels may identify object features according to relevance in subsequent processing operations, such as identifying particular data format or informational content. For example, metadata labels may include personal information labels such as "name," "address," "social security number," "driver license number," "date of birth," "credit score," "account number," "routing number," "photograph" etc. as would be understood by one having ordinary skill in the art upon reading the present descriptions.

In operation 710, the mobile device processor is used to extract data from the digital image based at least in part on the extraction model. Notably, extracting the data does not utilize optical character recognition (OCR) techniques. However, as described in further detail below, optical character recognition techniques may be utilized outside the context of data extraction as performed in operation 710.

Figure 8:
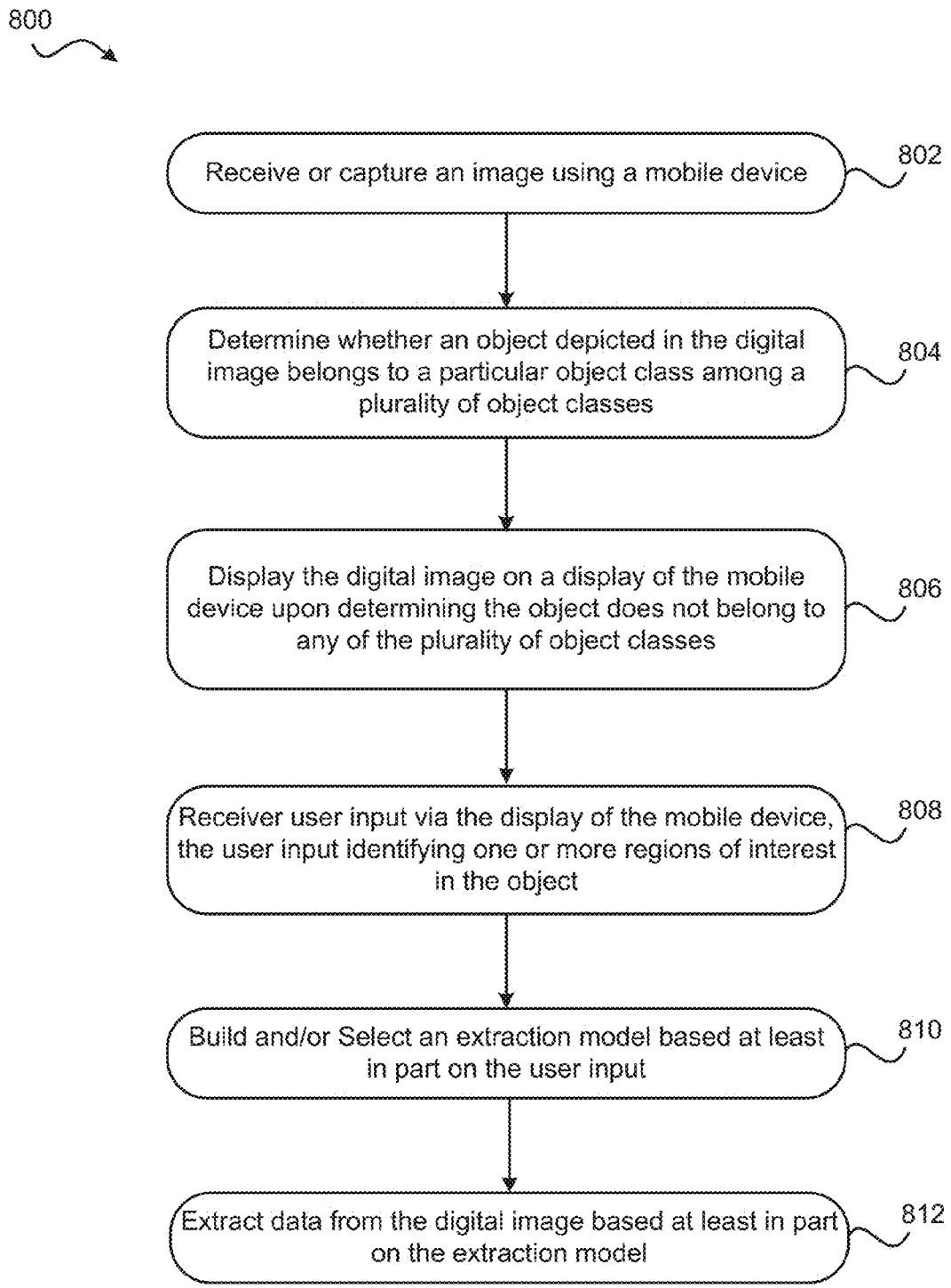
FIG. 8 is a flowchart of a method, according to one embodiment.

Referring now to FIG. 8, a method 800 is shown, according to one embodiment. The method may be performed in any suitable environment and/or utilizing any suitable mechanism(s), including those depicted in FIGS. 1-4D, in various approaches. In one view, the method 800 may be considered an implementation of a data extraction process as described herein; the implementation is in the format of a mobile application being engaged by a user.

In one approach, method 800 includes operation 802, where a digital image captured by a mobile device is received. The digital image may be received and/or stored in a memory of the mobile device or another mobile device, in some embodiments. Moreover, the digital image may be received from a variety of sources, such as a component of the mobile device including a camera, a memory, wireless receiver, antenna, etc. as would be understood by one having ordinary skill in the art upon reading the present descriptions. In other approaches, the digital image may be received from a remote device, such as a remote server, another mobile device, a camera with integrated data transmission capability, a facsimile machine or other multifunction printer, etc. The digital image may optionally be received via an online service, a database, etc. as would be understood by the skilled artisan reading this disclosure.

Method 800 further includes performing operations 804-812 using one or more of a processor of the mobile device, a processor of a server, one or more processors of a remote cloud computing environment, etc., which are described in further detail below.

In operation 804, the mobile device processor is used to determine whether an object depicted in the digital image belongs to a particular object class among a plurality of object classes. Determining whether an object belongs to a particular object class may be performed according to any suitable method, and is preferably performed in a manner commensurate with the descriptions above regarding Document Classification, e.g. as set forth with respect to FIGS. 5 & 6, in various embodiments.

In operation 806, once again using the processor of the mobile device, the digital image is displayed on a mobile device display. The digital image is displayed in response to determining the object does not belong to any particular object class among the plurality of object classes. Additionally and/or alternatively, the digital image may be displayed in response to determining the object does belong to a particular object class among the plurality of object classes.

Displaying the digital image on the mobile device display enables further action conducive to efficient and robust extraction of data from digital images using a processor. For example, in various approaches the digital image may be displayed on the mobile device display to provide feedback regarding the digital image, such as image quality, object classification (or lack thereof), extracted data, etc. Similarly, the digital image may be displayed to facilitate receiving additional input from a user, such as: user feedback regarding a classification and/or extraction result; metadata associated with or to be associated with the digital image, object depicted therein, and/or a particular object class to which the depicted object is determined to belong, etc.; instructions to perform additional processing, extraction, or other manipulation of the digital image, etc. as would be understood by one having ordinary skill in the art upon reading the present descriptions.

Operation 808 includes using the mobile device processor to receive user input via the display of the mobile device. More particularly, the user input identifies one or more regions of interest in the object. In one embodiment of a method 800 including operation 808, the image of the identifying document may be presented to the user via the mobile device display. The user may be prompted to confirm, negate, and/or modify regions of interest identified based on an object classification. The user may additionally and/or alternatively be prompted to define, confirm, negate, and/or modify one or more regions of interest not identified based on the classification, in various embodiments.

In operation 810, an extraction model is built and/or selected based at least in part on the user input received in operation 808. In one exemplary approach, based on the user input identifying the region(s) of interest, operation 810 may include reviewing one or more existing object class definitions to determine whether the identified regions of interest define a pattern that matches, corresponds, or is similar to a pattern defining regions of interest of objects belonging to the existing object class. Upon determining the patterns match, correspond or are similar, operation 810 may include selecting an existing extraction model defined for the matching object class, and utilize that extraction model to extract data from the digital image. Alternatively, operation 810 may include analyzing the image and characteristics thereof to define a feature vector descriptive of the image characteristics. This new feature vector may be used to modify a list of feature vectors and/or feature matrix descriptive of the existing object class having the matching, corresponding, or similar pattern of regions of interest. The resulting extraction model is configured to extract data from images depicting objects belonging to the existing object class, including raw image data, data corresponding to text, images, photographs, symbols, etc. as would be understood by one having ordinary skill in the art upon reading the present descriptions.

Additionally and/or alternatively, operation 810 may include building a new extraction model based on the user input defining the regions of interest, in some approaches. More specifically, using the processor of the mobile device, the image is analyzed and characteristics thereof used to define a feature vector descriptive of the image characteristics. For example, the feature vector may correspond to image characteristics such as pixel brightness and/or intensity in one or more color channels, brightness and/or intensity of one or more neighboring pixels in one or more color channels, positional relationship of pixels in the image or in a subregion of the image, regions of a document likely to depict text, regions of a document likely to depict a photograph, etc. Image analysis and feature vector definition may be performed in any suitable manner, and preferably may be performed substantially as described above regarding "Document Classification" and "Additional Processing." Using the feature vector, operation 810 may include building an extraction model configured to extract data corresponding to image characteristics depicted in the region(s) of interest.

In operation 812, data is extracted from the image based at least in part on the extraction model. Notably, the extraction process does not utilize any OCR techniques. Rather, the extraction model is defined based on a feature vector list of feature vectors and/or feature matrix descriptive of an object or object class, respectively.

In one illustrative embodiment, a user, via a mobile application adapted to facilitate performing data classification and/or extraction as described herein, may perform a classification operation to attempt classifying an object depicted in a digital image. Depending on whether the classification algorithm has been trained to recognize an object as belonging to a particular object class, the algorithm may or may not successfully classify the particular object depicted in the digital image. After completing one or more classification attempts, the image of the identifying document may be presented to the user via the mobile device display. The user may be prompted to confirm, negate, and/or modify regions of interest identified based on the object classification. The user may additionally and/or alternatively be prompted to define one or more regions of interest not identified based on the classification.

Similarly, if the classification attempt fails to identify the object class, the user may be prompted to define a new object class and further define one or more regions of interest in object belonging to the new object class by interacting with the display of the mobile device. For example, a user may draw one or more bounding boxes around regions of interest by providing tactile feedback via the mobile device display. The user may then direct the mobile application to extract data from the digital image, and the application optionally employs the processor of the mobile device, a server, etc. to build and/or select an extraction model based at least in part on the user-defined regions of interest and extract data from the digital image based in whole or in part on the extraction model.

In various approaches, methods 700 and/or 800 may optionally include one or more additional functionalities, features and/or operations as described below.

In one approach, method 700 and/or method 800 may further include training the extraction model. Training an extraction model may be accomplished using any known method, model, mechanism, etc. as would be understood by one having ordinary skill in the art upon reading the present descriptions. In a preferred embodiment, training comprises a learn-by-example (LBE) process. Specifically, for a particular object class, a plurality of representative objects may be provided with or without associated metadata labels. Based at least in part on the object features of the provided representative objects, the extraction model may be trained to modify and thus improve the robustness of extracting data from objects belonging to the object class.

Those having ordinary skill in the art will appreciate that in some approaches extraction model training may be specifically designed to improve the ability of the extraction model to precisely and accurately extract data from objects corresponding to a particular object class for which the extraction model was built. Such training may improve extraction precision and/or accuracy by training the model by providing a set of objects characterized by substantially identical object features, e.g. a plurality of copies of the same object type such as a standardized form, document type, multiple images of the same object, etc. Using this training set, the extraction model may reinforce the list of feature vectors and/or feature matrix representing objects in the class, and improve the robustness of extracting data from objects belonging to the class.

Alternatively, training may be specifically designed to improve the ability of the extraction model to extract data from a set of objects within an object class characterized by variable object features, or across several object classes. Such training may involve providing a set of objects with diverse characteristics to improve the extraction model's ability to extract data generally from a diverse object class or several object classes.

In more approaches, the extraction model may be trained using the processor of the mobile device. Moreover, the trained extraction model may be stored and/or exported, e.g. to a memory, a buffer, another process or processor, etc. The trained extraction model may be preferably stored and/or exported to a memory of the mobile device, a processor of the mobile device, or another process being executed using the processor of the mobile device. In various embodiments, the trained extraction model may be flagged and/or retrieved for subsequent use by the mobile device or another mobile device. Similarly, the extraction model may be stored and/or passed to a memory and/or processor of another device, such as another mobile device, a server, a cloud computing environment, etc.

Preferably, training as described herein utilizes a training set comprising a plurality of objects, and more preferably the training set comprises no less than five objects.

In addition to training the extraction model, some embodiments of method 700 may additionally and/or alternatively encompass performing at least one OCR technique on one or more regions of the digital image. The OCR'ed region(s) may correspond to one or more of the object features (e.g. object features identified using the object class definition and/or extraction model) and/or other object features (e.g., features were not previously identified using the object class definition and/or extraction model).

Still more embodiments of method 700 and/or method 800 may further include detecting one or more lines of text in objects such as documents. In some approaches, detecting text lines involves projecting the digital image onto a single dimension. In an exemplary approach, a projection may be made along a dimension perpendicular to the predominant axis of text line orientation, so that text lines and areas between lines of text can be easily distinguished according to dark area density (e.g. black pixel density, count, etc.). Thus, if the document is oriented in portrait, detecting text includes projecting along the vertical dimension (y-axis) and if the document is in landscape orientation, detecting text includes projecting along the horizontal dimension (x-axis). The projection can also be used to determine and/or manipulate orientation (portrait, landscape, or any other angle of skew) of a document, in other approaches. For example, in an exemplary embodiment configured to classify and extract data from images of documents corresponding to a standard ID such as a driver's license, detecting lines of text, etc. may be utilized to determine a most likely document orientation from among a plurality of possible orientations (e.g. 0°, 90°, 180°, or 270° rotation angle, in one approach).

Detecting text lines may additionally include determining a distribution of light and dark areas along the projection; determining a plurality of dark pixel densities. Moreover, each dark pixel density may correspond to a position along the projection. Upon determining the plurality of dark pixel densities, probable text lines may be determined according to whether the corresponding dark pixel density is greater than a probable text line threshold, which may be predefined by a user, determined experimentally, automatically determined, etc. In embodiments where a probable text line threshold is employed, detecting text lines further includes designating each position as a text line upon determining the corresponding dark pixel density is greater than the probable text line threshold.

In another embodiment detecting text lines may include detecting a plurality of connected components non-background elements in the digital image, and determining a plurality of likely characters based on the plurality of connected components. Likely characters may be regions of a digital image characterized by a predetermined number of light-to-dark transitions in a given direction, such as three light-to-dark transitions in a vertical direction as would be encountered for a small region of the digital image depicting a capital letter "E," each light-to-dark transition corresponding to a transition from a background of a document (light) to one of the horizontal strokes of the letter "E." Of course, other numbers of light-to-dark transitions may be employed, such as two vertical and/or horizontal light-to-dark transitions for a letter "o," one vertical light to dark transition for a letter "l," etc. as would be understood by one having ordinary skill in the art upon reading the present descriptions. Upon determining likely characters, lines of text may be determined by identifying regions of the image having a plurality of adjacent characters, and may define the text lines according to a text baseline of the plurality of adjacent characters, in one embodiment.

In some approaches, it is possible to determine and/or manipulate image orientation based on the result of projecting the image along one dimension. For example, if a projection produces a one-dimensional pattern of high dark pixel density regions interspersed with low dark pixel density regions, then it is probable that the projection was made along the axis perpendicular to the longitudinal axis of text line orientation (i.e. a projection along the y-axis for a document in "portrait" orientation having text oriented from left-to-right along the x-axis of the image; or a projection along the x-axis for a document in "landscape" orientation having text oriented bottom-to-top along the y-axis of the image). Based on this probabilistic determination, one may optionally rotate and/or reorient the image based on projection results.

Those having ordinary skill in the art will appreciate that detecting text lines based on dark pixel density along a one-dimensional projection may be particularly challenging for color images. For example, some documents may depict text in a color relatively lighter than the background, in which case dark pixel density would indicate absence of a probable text line rather than presence thereof. In that case, detecting text lines may involve designating probable text lines near any position along the projection upon determining the position is characterized by a dark pixel density less than a dark pixel density threshold.

Moreover, text may be presented in a variety of colors, and mere dark pixel density may be an insufficient characteristic from which to identify probable text lines. In order to address these challenges, detecting text lines in color images preferably includes projecting each color channel of the digital image onto a single channel along the single dimension. In other words, color channel intensity values (e.g. integer values between 0-255) are transformed into a single intensity value. The transformation may be accomplished according to any suitable function, and in a preferred embodiment the intensity of each color channel for a given pixel or set of pixels is averaged and the pixel or set of pixels is assigned a representative intensity value according to the average of the color channel intensity values.

In another embodiment, data extraction may include associating object classes with one or more lists of object regions containing information of interest, for example a list of rectangular regions of a document that contain text, or that may contain text and the color of expected text.

In one illustrative example, a user is presented an image of an object via a display of a mobile device. The user interacts with the image via the mobile device display, and defines one or more regions of interest, for example indicating a region displaying the user's name, address, license number, etc. The user can repeat the process for a multitude of images, and thus provide training images either intentionally or as part of a transparent process. Once a sufficient number of training examples have been defined (e.g. about 5 in the case of a small document such as a driver license), the training algorithm may be executed automatically or at the user's discretion. The result of training is an extraction model can be used to automatically extract the relevant locations and rectangles of subsequently presented unknown documents, all without utilizing OCR techniques.

In other approaches, after data is extracted according to the above-described methods, OCR techniques may be utilized for purposes other than mere data extraction. For example, OCR may be performed using a processor of the mobile device, and may only OCR a small subset of the total image. Alternatively, OCR may be performed using a processor of a server. In order reduce communication time between the mobile device and the server, only portion(s) of the image to be processed using OCR may be transmitted to the server.

In additional embodiments, classification and/or extraction results may be presented to a user for validation, e.g. for confirmation, negation, modification of the assigned class, etc. For example, upon classifying an object using semi- or fully automated processes in conjunction with distinguishing criteria such as defined herein, the classification and the digital image to which the classification relates may be displayed to a user (e.g. on a mobile device display) so that the user may confirm or negate the classification. Upon negating the classification, a user may manually define the "proper" classification of the object depicted in the digital image. This user input may be utilized to provide ongoing "training" to the classifier(s), in preferred approaches. Of course, user input may be provided in relation to any number of operations described herein without departing from the scope of the instant disclosures.

In even more preferred embodiments, the aforementioned validation may be performed without requiring user input. For instance, it is possible to mitigate the need for a user to review and/or to correct extraction results by performing automatic validation of extraction results. In general, this technique involves referencing an external system or database in order to confirm whether the extracted values are known to be correct. For example, if name and address are extracted, in some instances it is possible to validate that the individual in question in fact resides at the given address.

This validation principle extends to classification, in even more embodiments. For example, if the extraction is correct, in some approaches it is appropriate to infer that the classification is also correct. This inference relies on the assumption that the only manner in which to achieve the "correct" extraction result (e.g. a value matches an expected value in a reference data source, matches an expected format for the value in question, is associated with an expected symbol or other value, etc. as would be understood by one having ordinary skill in the art upon reading the present descriptions).

While the present descriptions of data extraction within the scope of the instant disclosure have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein, such as methods 700 and 800.

Similarly, a computer program product within the scope of the present descriptions may include a computer readable storage medium having program code embodied therewith, the program code readable/executable by a processor to cause the processor to perform steps of a method as described herein, such as methods 700 and 800.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
receiving or capturing digital image data;
detecting an object depicted in a digital image represented by the digital image data, wherein detecting the object comprises defining a plurality of candidate edge points based on statistically significant differences between each respective candidate edge point and a background of the digital image;
processing the digital image to improve an image quality of at least the object;
determining an object classification based on the processed digital image;
building or determining an extraction model based at least in part on the object classification; and
extracting, using the extraction model, information from one or more regions of interest within the digital image;
wherein each region of interest depicts one or more object features selected from: text characters, symbols, photographs, and image characteristics; and
wherein the information comprises one or more of:
an object feature color;
an object feature size;
an object feature dimensions;
an object feature shape;
an object feature texture;
an object feature brightness;
an object feature intensity in one or more color channels;
a position of one or more object features depicted in the digital image; and
a positional relationship between one or more object features depicted in the digital image.

2. The method as recited in claim 1, wherein the detecting is based on the one or more object features.

3. The method as recited in claim 1, further comprising associating metadata labels to one or more of the object features, wherein the metadata labels identify one or more of:
an object feature data type;
an object feature data format;
an object feature text information content; and
an object feature location information.

4. The method as recited in claim 1, wherein the processing comprises one or more of:
rectangularizing the object based at least in part on the one or more object features;
cropping the digital image based at least in part on the one or more object features; and
binarizing the digital image based at least in part on the one or more object features.

5. The method as recited in claim 1, wherein the detecting comprises a window-based analysis of a plurality of sections of the digital image.

6. The method as recited in claim 5, wherein defining each candidate edge point comprises:
defining one or more large analysis windows within the digital image;
defining a plurality of small analysis windows within the digital image;
estimating one or more distributions of statistics for each large analysis window;
calculating one or more statistics for each small analysis window;
determining whether a statistically significant difference exists between one or more of the statistics calculated for each of the small analysis windows and a corresponding distribution of statistics estimated for the one or more large analysis windows; and
designating a point in each small analysis window for which the statistically significant difference exists as a candidate edge point upon determining the statistically significant difference exists.

7. The method as recited in claim 5, wherein the window-based analysis employs a plurality of large analysis windows several pluralities of small analysis windows, each plurality of small analysis windows corresponding to one of the large analysis windows.

8. The method as recited in claim 5, wherein the window-based analysis comprises a step-over approach analyzing the digital image according to a predefined pattern.

9. The method as recited in claim 8, wherein the predefined pattern is selected from: spiral; serpentine; shingled; checkerboard; and striped.

10. The method as recited in claim 1, wherein the statistically significant differences are evaluated according to one or more metrics selected from: a p-value, a z-test, and a chi-squared correlation.

11. The method as recited in claim 1, wherein the processing comprises correcting one or more of distortion and skew within the digital image, and wherein the correcting comprises:
generating a rectangularized digital image from the digital image;
determining a pair of rectangle-based coordinates for each point within the rectangularized digital image; and
matching each pair of rectangle-based coordinates to an equivalent pair of tetragon-based intrinsic coordinates within the digital image.

12. The method as recited in claim 1, wherein the processing comprises:
detecting uneven illumination within the digital image, and
normalizing illumination within the digital image in response to detecting the uneven illumination.

13. The method as recited in claim 12, wherein detecting the uneven illumination comprises:
dividing the digital image into a plurality of sections;
determining whether each section is oversaturated;
determining whether each section is undersaturated;
determining a number of oversaturated sections;
determining a number of undersaturated sections;
determining that the digital image is oversaturated upon determining that a ratio of the number of oversaturated sections to a total number of sections exceeds an oversaturation threshold;
determining that the digital image is undersaturated upon determining that a ratio of the number of undersaturated sections to the total number of sections exceeds an undersaturation threshold; and
determining that an illumination problem exists in the digital image upon determining that the digital image is either undersaturated or oversaturated; and
wherein normalizing the illumination comprises:
deriving a two-dimensional illumination model from the digital image; and
applying the two-dimensional illumination model to each pixel in the digital image.

14. The method as recited in claim 1, comprising determining one or more object features of the object based on a feature vector corresponding to the object classification.

15. The method as recited in claim 1, wherein the processing comprises detecting blur within the digital image; and wherein detecting the blur comprises:

dividing the digital image into a plurality of sections, each section comprising a plurality of pixels, and, for each section:
  determining whether the section contains one or more sharp pixel-to-pixel transitions in a first direction;
  counting a total number of first direction sharp pixel-to-pixel transitions for the section ($S_{S1}$);
  determining whether the section contains one or more blurred pixel-to-pixel transitions in the first direction;
  counting a total number of first-direction blurred pixel-to-pixel transitions for the section ($S_{B1}$);
  determining whether the section contains one or more sharp pixel-to-pixel transitions in a second direction;
  counting a total number of second-direction sharp pixel-to-pixel transitions for the section ($S_{S2}$);
  determining whether the section contains one or more blurred pixel-to-pixel transitions in the second direction;
  counting a total number of second-direction blurred pixel-to-pixel transitions for the section ($S_{B2}$);
  determining the section is blank upon determining:
    $S_{S1}$ is less than a predetermined sharp transition threshold,
    $S_{B1}$ is less than a predetermined blurred transition threshold,
    $S_{S2}$ is less than a predetermined sharp transition threshold, and
    $S_{B2}$ is less than a predetermined blurred transition threshold; and
  determining, for all non-blank sections, a first direction blur ratio $r_1=S_{S1}/S_{B1}$;
  determining, for all non-blank sections, a second direction blur ratio $r_2=S_{S2}/S_{B2}$;
  determining that a non-blank section is blurred in the first direction upon determining that $r_1$ is less than a predefined section blur ratio threshold; and
  determining that a non-blank section is blurred in the second direction upon determining that $r_2$ is less than the predefined section blur ratio threshold; and
  determining that a non-blank section is blurred upon determining one or more of:
    the section is blurred in the first direction, and
    the section is blurred in the section direction; and
  determining a total number of blurred sections;
  calculating an image blur ratio R comprising the total number blurred sections to a total number of sections; and
  determining the digital image is blurred upon determining the image blur ratio is greater than a predetermined image blur threshold.

16. The method as recited in claim 1, wherein the processing comprises: estimating a resolution of the digital image; and wherein estimating the resolution of the digital image comprises:
  detecting a plurality of connected components of a plurality of non-background elements in the digital image;
  determining a plurality of likely characters based on the plurality of connected components;
  determining one or more average character dimensions based on the plurality of likely characters; and
  estimating the resolution of the digital image based on the one or more average character dimensions.

17. The method as recited in claim 1, wherein the information further comprises either or both of: an object feature text information; and an object feature text format.

18. A mobile device configured to execute logic, the mobile device comprising logic configured to cause the mobile device, upon execution thereof, to:
  receive or capture digital image data;
  detect a document depicted in a digital image represented by the digital image data, wherein detecting the document comprises defining a plurality of candidate edge points based on statistically significant differences between each respective candidate edge point and a background of the digital image;
  process the digital image to improve an image quality of at least the document;
  determine a document classification based on the processed digital image;
  build or determine an extraction model based at least in part on the document classification; and
  extract, using the extraction model, information from one or more regions of interest within the document;
  wherein each region of interest depicts one or more object features selected from: text characters, symbols, photographs, and image characteristics; and
  wherein the information comprises one or more of:
    an object feature color;
    an object feature size;
    an object feature dimensions;
    an object feature shape;
    an object feature texture;
    an object feature brightness;
    an object feature intensity in one or more color channels;
    a position of one or more object features depicted in the digital image; and
    a positional relationship between one or more object features depicted in the digital image.

19. A computer program product comprising a non-transitory computer readable storage medium having embodied thereon executable instructions configured to cause a mobile device, upon execution of the instructions, to:
  receive or capture digital image data;
  detect a document depicted in a digital image represented by the digital image data, wherein detecting the document comprises defining a plurality of candidate edge points based on statistically significant differences between each respective candidate edge point and a background of the digital image;
  process the digital image to improve an image quality of at least the document;
  determine a document classification based on the processed digital image;
  build or determine an extraction model based at least in part on the document classification; and
  extract, using the extraction model, information from one or more regions of interest within the document;
  wherein each region of interest depicts one or more object features selected from: text characters, symbols, photographs, and image characteristics; and
  wherein the information comprises one or more of:
    an object feature color;
    an object feature size;
    an object feature dimensions;
    an object feature shape;
    an object feature texture;
    an object feature brightness;
    an object feature intensity in one or more color channels;

a position of one or more object features depicted in the digital image; and a positional relationship between one or more object features depicted in the digital image.

* * * * *

UNITED STATES PATENT AND TRADEMARK OFFICE
CERTIFICATE OF CORRECTION

PATENT NO. : 9,754,164 B2  
APPLICATION NO. : 14/818196  
DATED : September 5, 2017  
INVENTOR(S) : Macciola et al.

Page 1 of 1

It is certified that error appears in the above-identified patent and that said Letters Patent is hereby corrected as shown below:

In the Specification

Column 2, Line 22 please replace "period "."versus a comma"."" with --period "." versus a comma ","--;

Column 13, Line 65 please replace "networks, servers. etc." with --networks, servers, etc.--;

Column 14, Line 49 please replace "location of text. etc. as" with --location of text, etc. as--;

Column 18, Line 29 please replace "reads "Jan. 14, 2011" the" with --reads "Jan, 14, 2011" the--;

Column 18, Line 34 please replace "at the end of 2011"" with --at the end of 2011"--.

Signed and Sealed this  
Tenth Day of July, 2018

Andrei Iancu  
*Director of the United States Patent and Trademark Office*